(12) United States Patent
Hoya et al.

(10) Patent No.: US 9,501,352 B2
(45) Date of Patent: Nov. 22, 2016

(54) MEMORY DEVICE

(71) Applicant: KABUSHIKI KAISHA TOSHIBA, Minato-ku, Tokyo (JP)

(72) Inventors: Katsuhiko Hoya, Yokohama Kanagawa (JP); Yasuyuki Eguchi, Kawasaki Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 160 days.

(21) Appl. No.: 14/458,783

(22) Filed: Aug. 13, 2014

(65) Prior Publication Data
US 2015/0254136 A1  Sep. 10, 2015

Related U.S. Application Data

(60) Provisional application No. 61/948,430, filed on Mar. 5, 2014.

(51) Int. Cl.
*G11C 29/00* (2006.01)
*G06F 11/10* (2006.01)

(52) U.S. Cl.
CPC .......... *G06F 11/1012* (2013.01); *G06F 11/108* (2013.01)

(58) Field of Classification Search
CPC ............. G06F 11/1012; G06F 11/108; G06F 11/1076
See application file for complete search history.

(56) References Cited

U.S. PATENT DOCUMENTS

| | | | |
|---|---|---|---|
| 2004/0004856 A1 | 1/2004 | Sakimura et al. | |
| 2006/0282755 A1* | 12/2006 | Oh ...................... | G06F 11/1052 714/801 |
| 2008/0133994 A1* | 6/2008 | Oh ...................... | G06F 11/1008 714/746 |
| 2008/0288809 A1* | 11/2008 | Koguchi ............. | G06F 11/1012 714/2 |
| 2009/0100315 A1* | 4/2009 | Lee ..................... | G06F 11/1068 714/763 |
| 2014/0169083 A1* | 6/2014 | Wang .................. | G11C 11/161 365/158 |

FOREIGN PATENT DOCUMENTS

| | | | |
|---|---|---|---|
| JP | 09134313 A | 5/1997 | |
| JP | 4798379 B2 | 10/2011 | |
| JP | 4956640 B2 | 6/2012 | |

OTHER PUBLICATIONS

S. Tanakamaru et al, "95%-Lower-BER 43%-Lower-Power Intelligent Solid-State Drive (SSD) with Asymmetric Coding and Stripe Pattern Elimination Algorithm", 2011 IEEE International Solid-State Circuits Conference, 11.4, pp. 204 and 205 (in English).

* cited by examiner

*Primary Examiner* — David Ton
(74) *Attorney, Agent, or Firm* — Holtz, Holtz & Volek PC

(57) ABSTRACT

According to one embodiment, an encoder generates a write data parity from write data to memory elements. A decoder corrects an error of read data from the memory elements using a read data parity for the read data and a check matrix. An inverter maintains or inverts all bits of a received input. Calculation by the decoder using the read data, the read data parity, and the check matrix produces a first result when an error is not included in the read data, a second result when an error is included in the read data, a third result when an error is not included in the read data and all bits of the read data are inverted, and a fourth result when an error is included in the read data and all bits of the read data are not inverted.

17 Claims, 34 Drawing Sheets

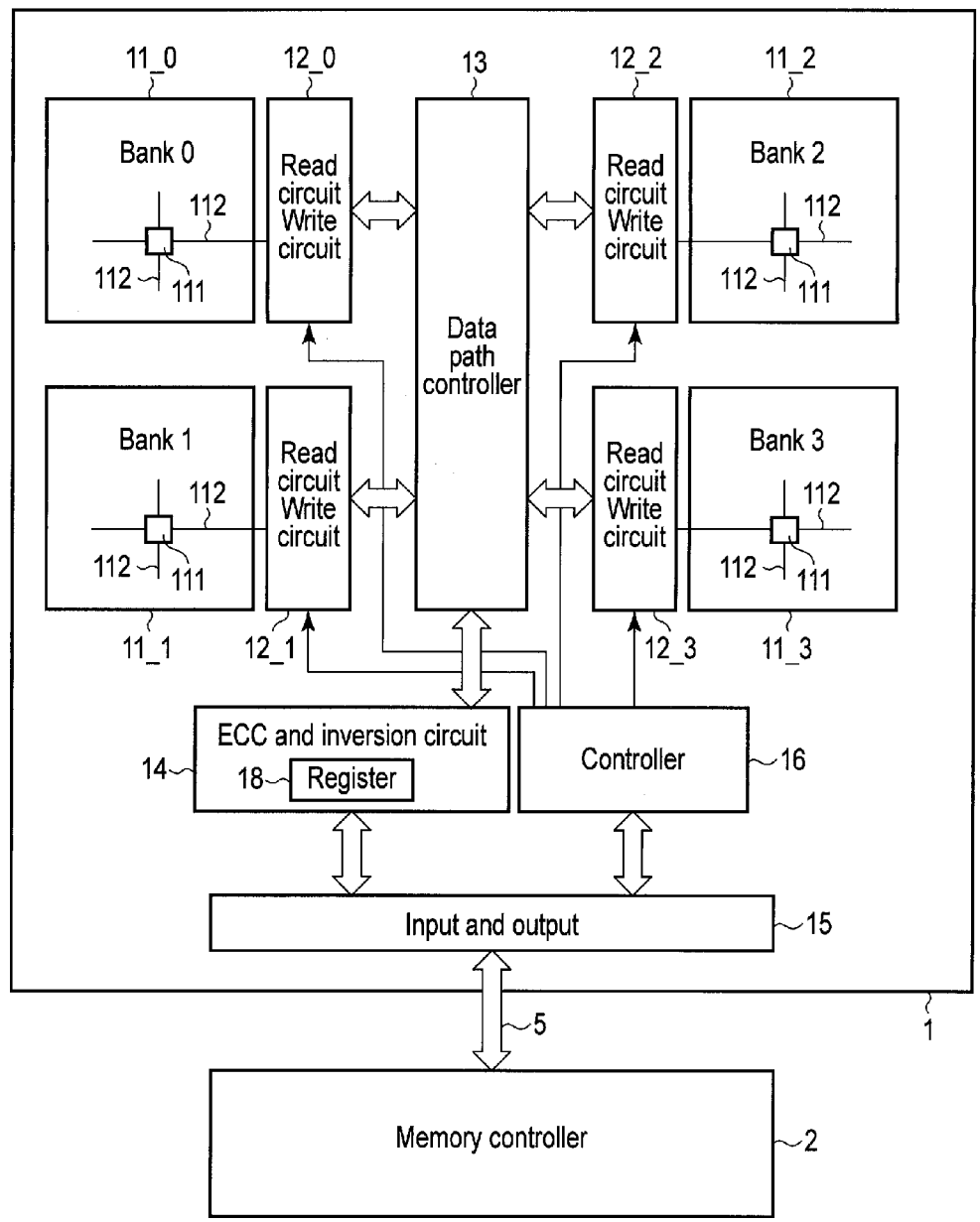
F I G. 1

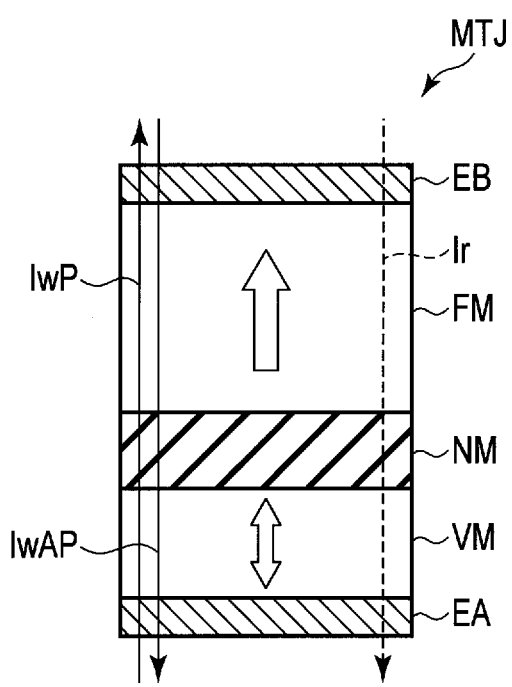
F I G. 2

$\omega H^T = \text{Zero matrix}$ .... (1)

$\omega' H^T = \text{Non-zero matrix}$ .... (2)

$s = (\omega + e) H^T = e H^T$ .... (3)

$s' = (\omega' + e) H^T = 1 + e H^T = \overline{e H^T}$ .... (4)

$\therefore e H^T \neq \overline{e H^T}$

F I G. 4

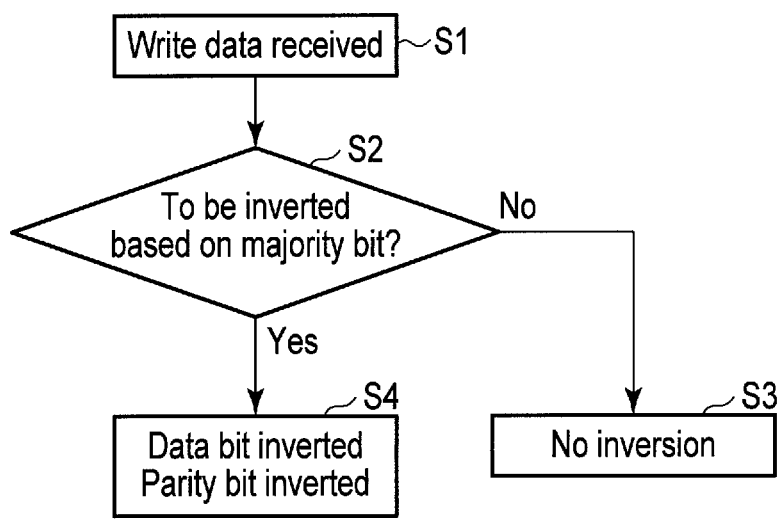
F I G. 7

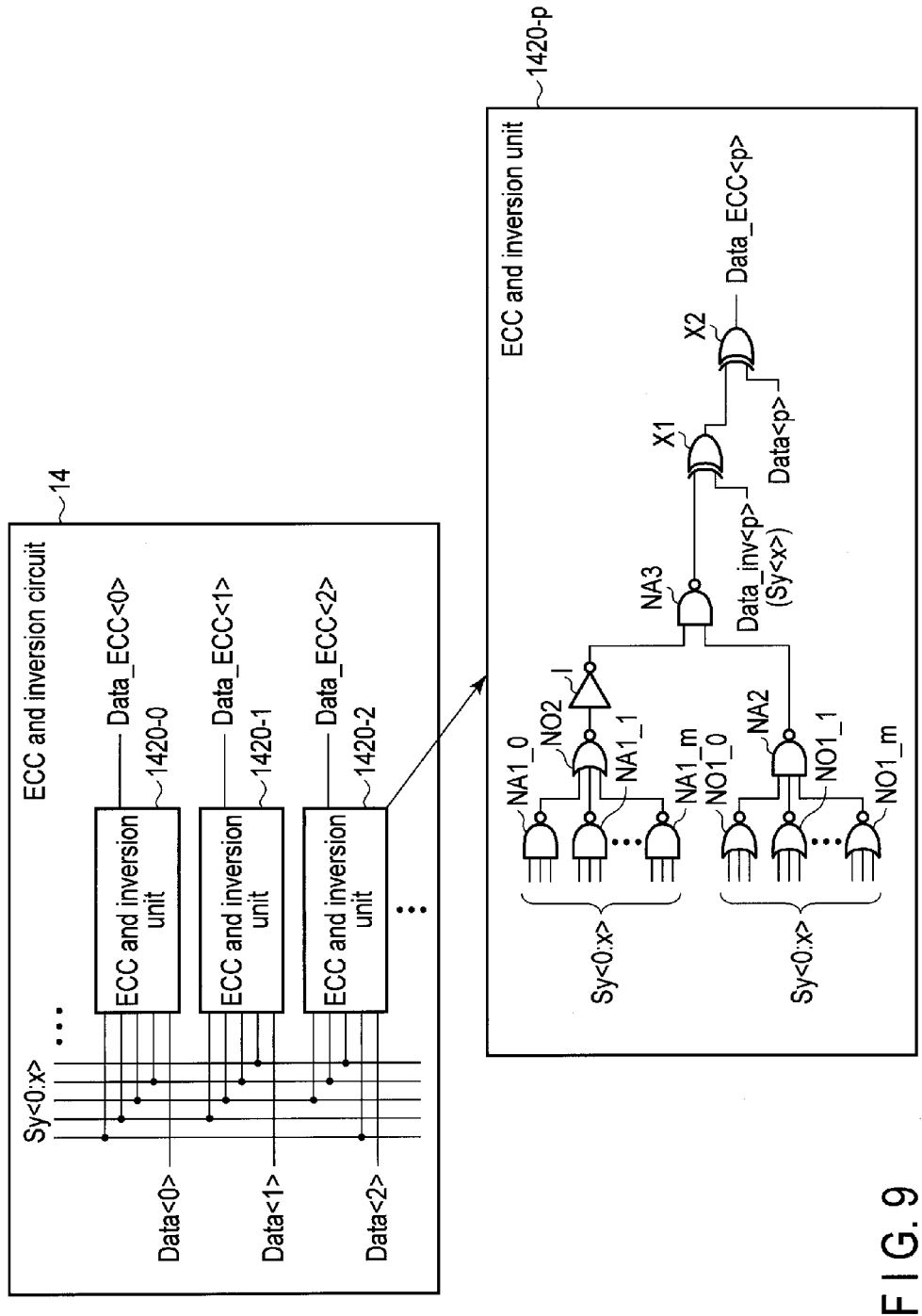
F I G. 9

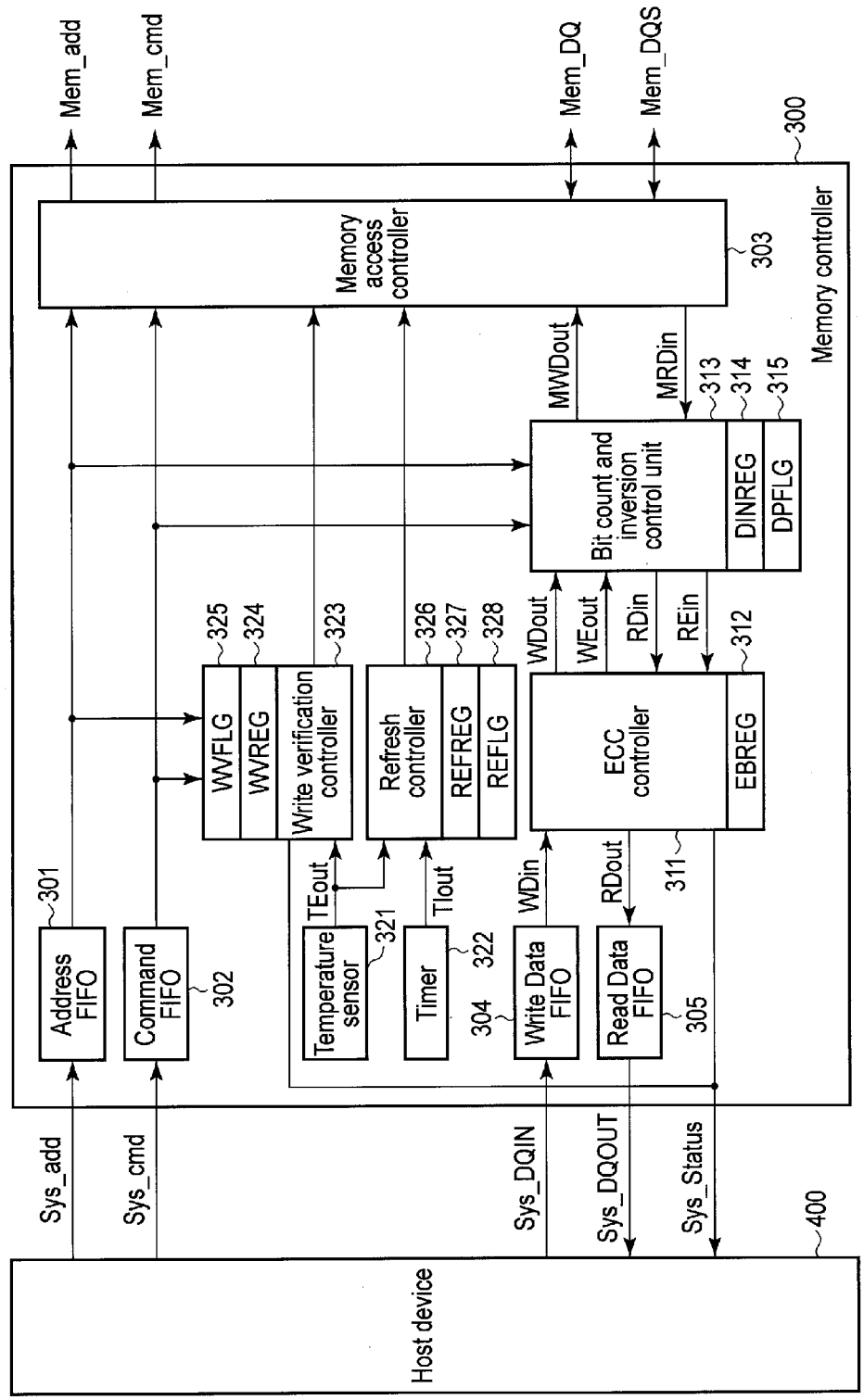
F I G. 10

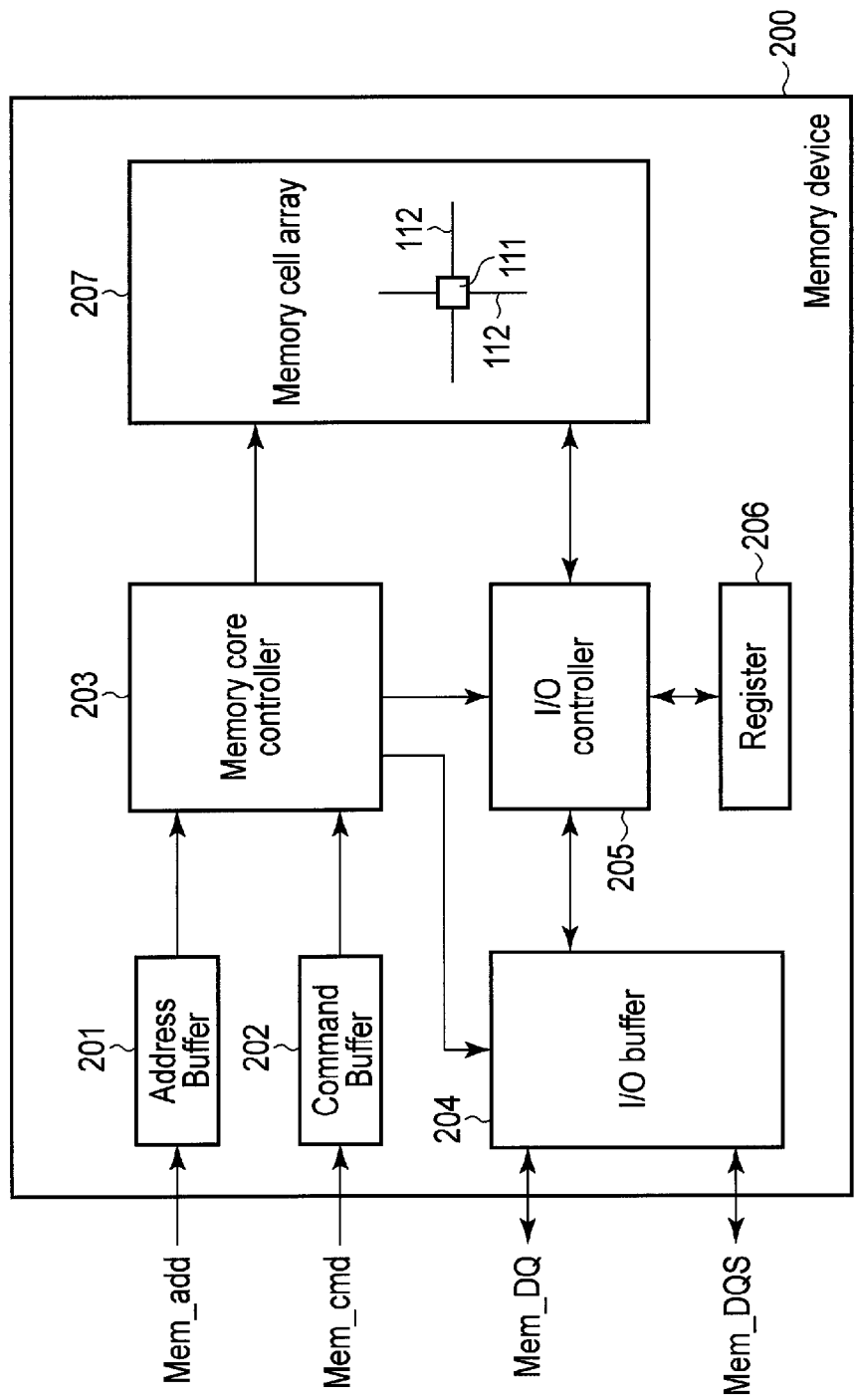
F.I.G. 11

FIG. 12

| EBREG_N[31:0] | Function |
|---|---|
| EBREG_N[31:16] | End address of error bit address range |
| EBREG_N[15:0] | Start address of error bit address range |

FIG. 13

| DINREG_N[31:0] | Function |
|---|---|
| DINREG_N[31:16] | End addresses of bit inversion address range |
| DINREG_N[15:0] | Start addresses of bit inversion address range |

FIG. 14

| DPFLG_N | Function |
|---|---|
| 0 | Data is 0-rich |
| 1 | Data is 1-rich |

FIG. 15

| Temp. range | TEout[1:0] |
|---|---|
| <25°C | 00 |
| 25°C-50°C | 01 |
| 50°C-75°C | 10 |
| 75°C< | 11 |

FIG. 16

| WVREG_N[31:0] | Function |
|---|---|
| WVREG_N[31:16] | End address of write verification address range |
| WVREG_N[15:0] | Start address of write verification address range |

| WVFLG_N | TEout[1:0] | Function1 | Function2 |
|---|---|---|---|
| 0 | XX | No write verification | No write verification |
| 1 | 00(<25°C) | Write verification | Write verification |
| | 01(25°C-50°C) | No write verification | |
| | 10(50°C-75°C) | | |
| | 11(75°C<) | | |

F I G. 17

| REFREG_N[31:0] | Function |
|---|---|
| REFREG_N[31:16] | End address of refresh address range |
| REFREG_N[15:0] | Start address of refresh address range |

F I G. 18

| REFLG_N | TEout[1:0] | Function1 | Function2 |
|---|---|---|---|
| 0 | XX | No refresh | No refresh |
| 1 | 00(<25°C) | No refresh | No refresh |
| | 01(25°C-50°C) | Refresh with cycle Tlout | |
| | 10(50°C-75°C) | Refresh with cycle Tlout/2 | Refresh with cycle Tlout |
| | 11(75°C<) | Refresh with cycle Tlout/4 | |

F I G. 19

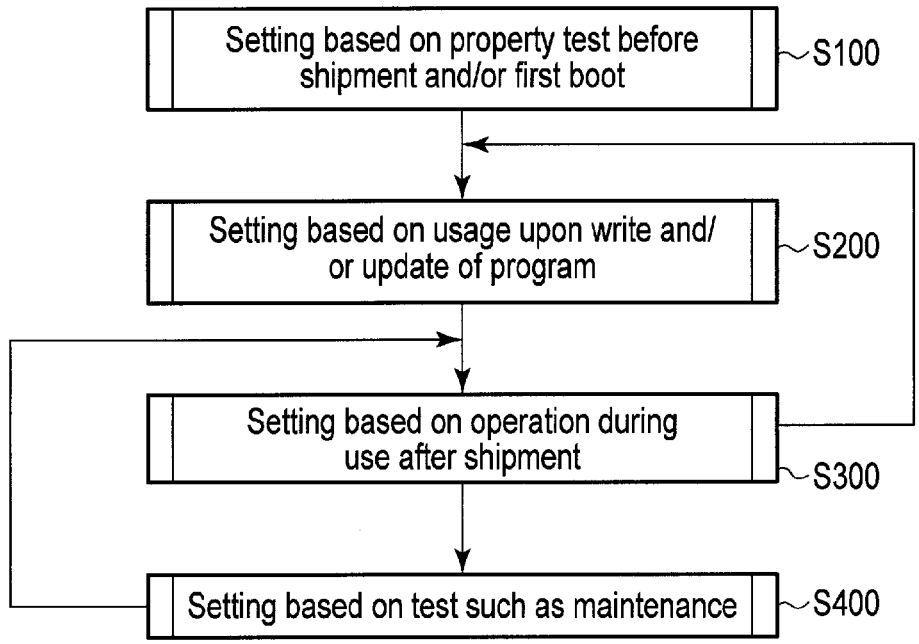
F I G. 20
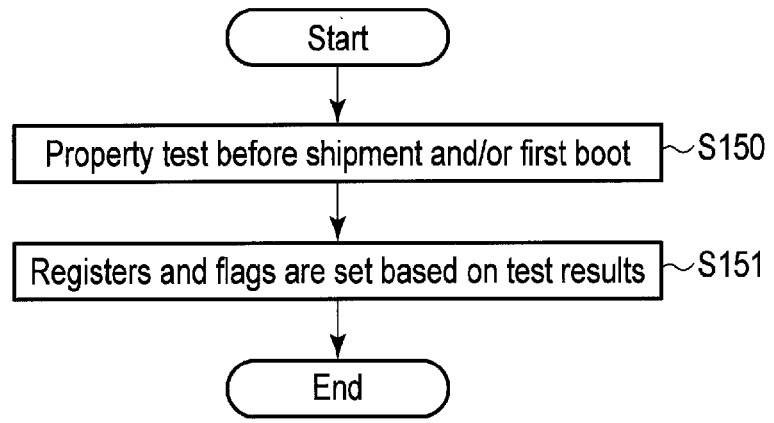
F I G. 21

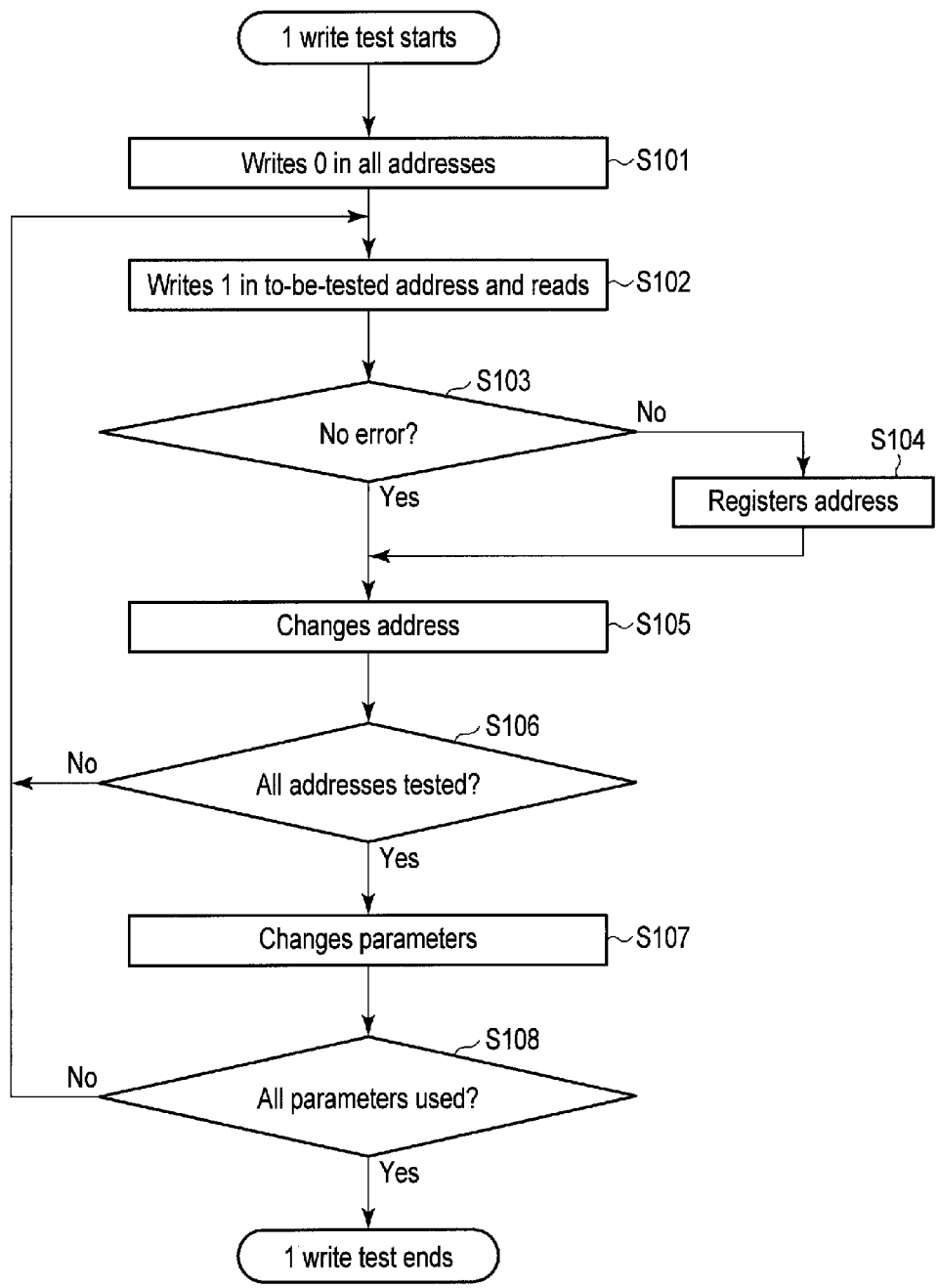
F I G. 22

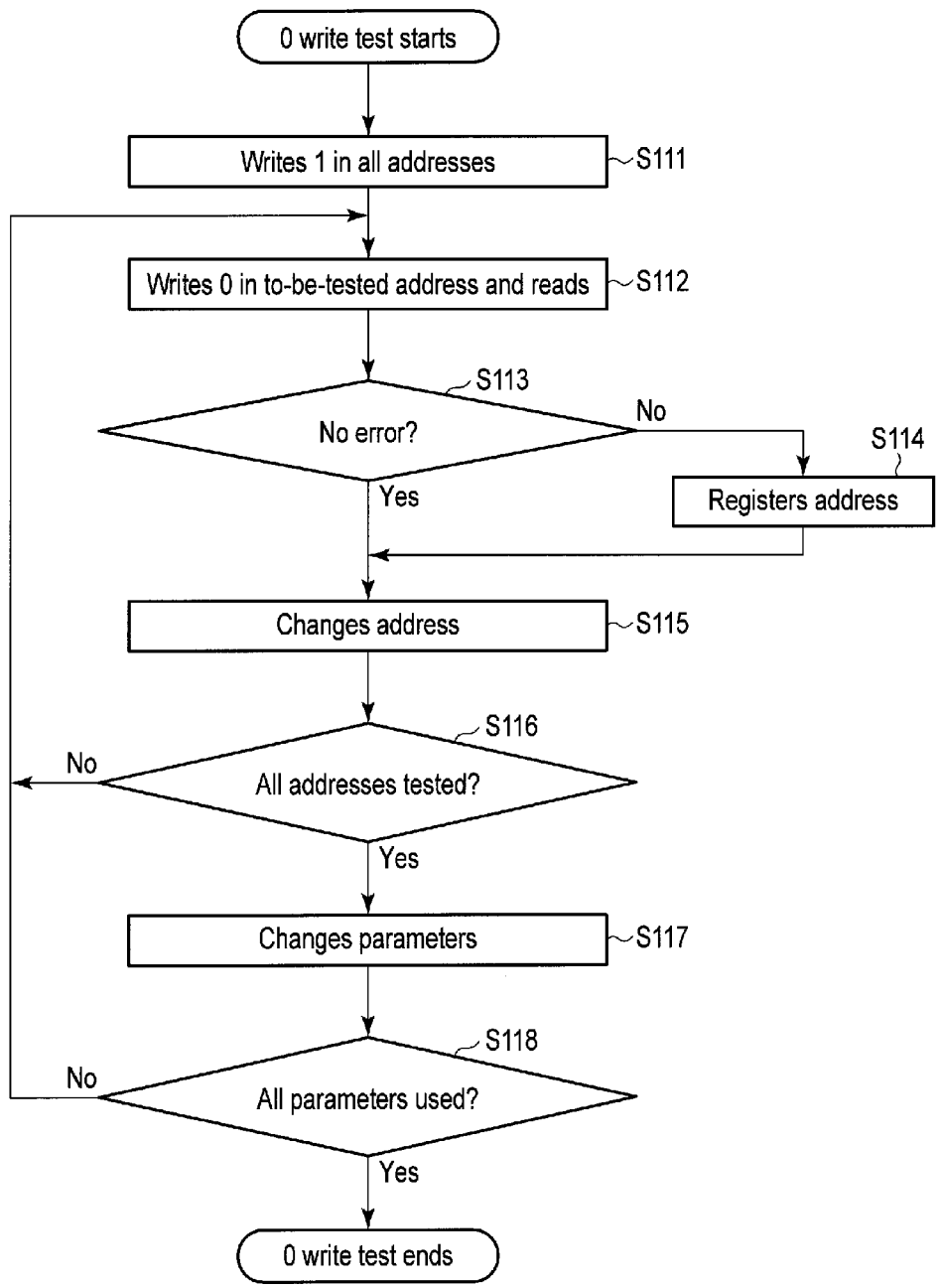
F I G. 23

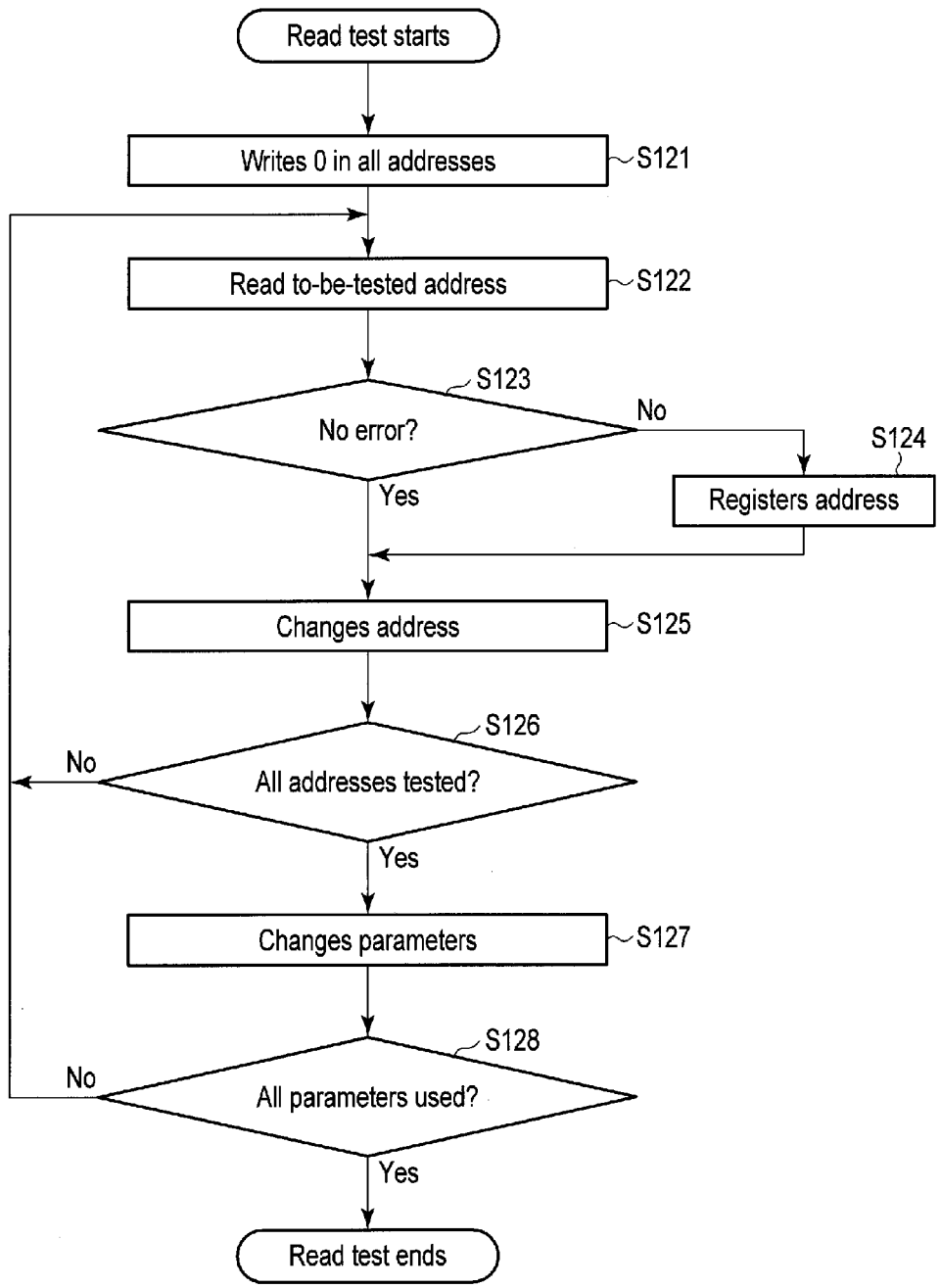
F I G. 24

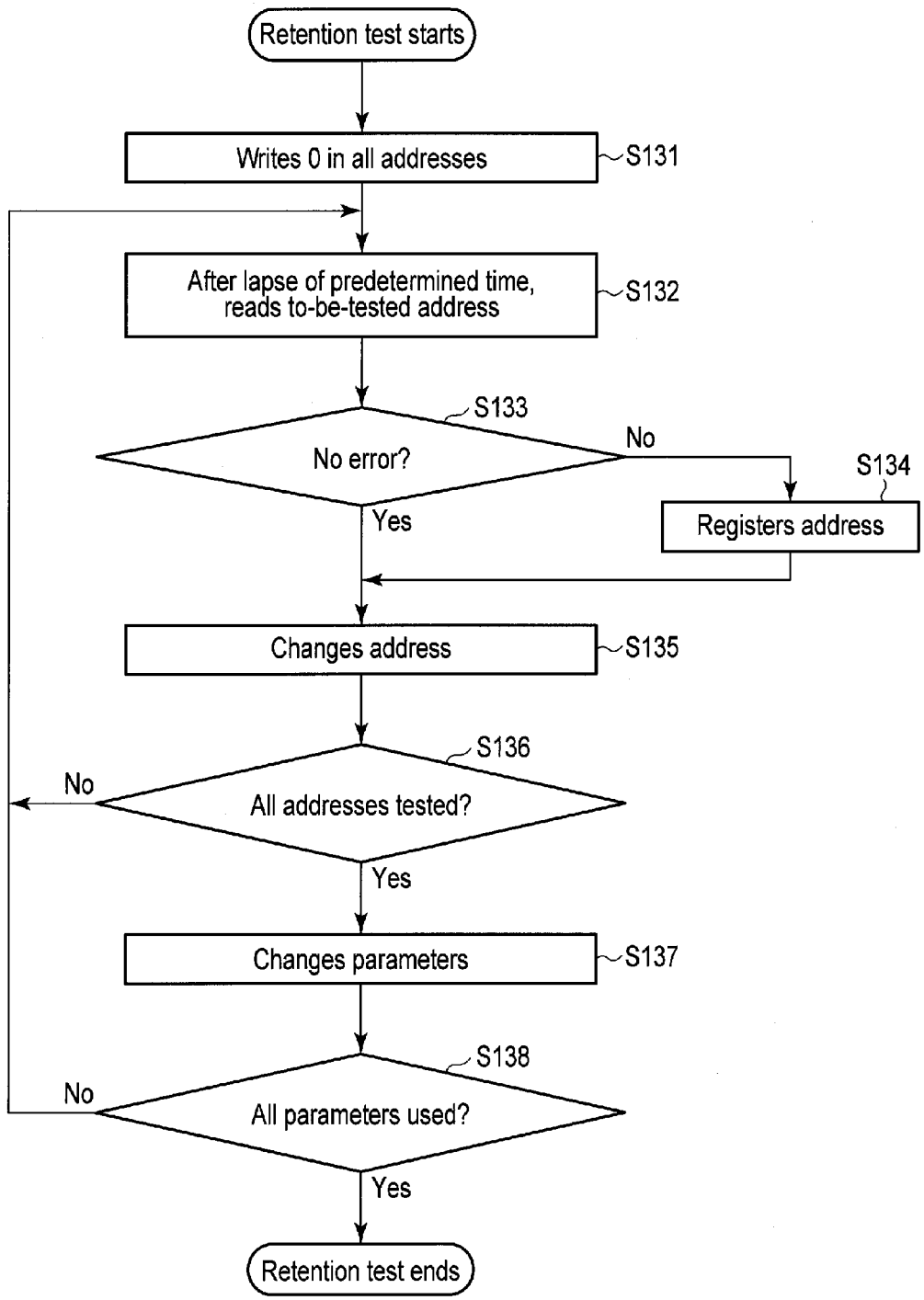
F I G. 25

| Address | | |
|---|---|---|
| EEEEh | | |
| | Work memory 1 | DINREG_3[31:16]=DDDDh, DINREG_3[0:15]=CCCCh, DPFLG_3=0b |
| DDDDh | | |
| CCCCh | Parameters for program 1 | WVREG_0[31:16]=BBBBh, WVREG_0[0:15]=AAAAh, WVREG_0=1b |
| BBBBh | | DINREG_2[31:16]=BBBBh, DINREG_2[0:15]=AAAAh, DPFLG_2=0b |
| AAAAh | | |
| | Program 1 | REFREG_1[31:16]=ZZZZh, REFREG_1[0:15]=YYYYh, REFLG_1=1b |
| ZZZZh | | DINREG_1[31:16]=ZZZZh, DINREG_1[0:15]=YYYYh, DPFLG_1=1b |
| YYYYh | | |
| XXXX0h | Boot and OS | REFREG_0[31:16]=XXXXh, REFREG_0[0:15]=0000h, REFLG_0=1b |
| 0000h | | DINREG_0[31:16]=XXXXh, DINREG_0[0:15]=0000h, DPFLG_0=1b |

F I G. 26

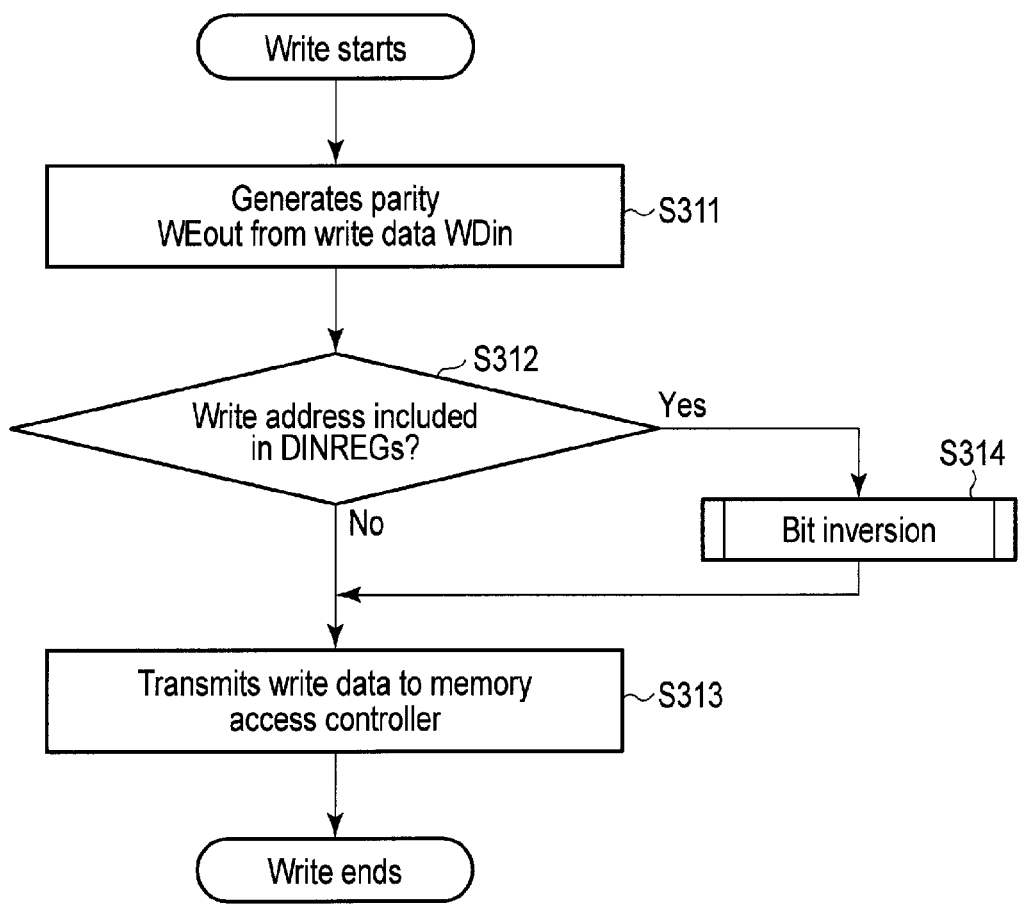
F I G. 27

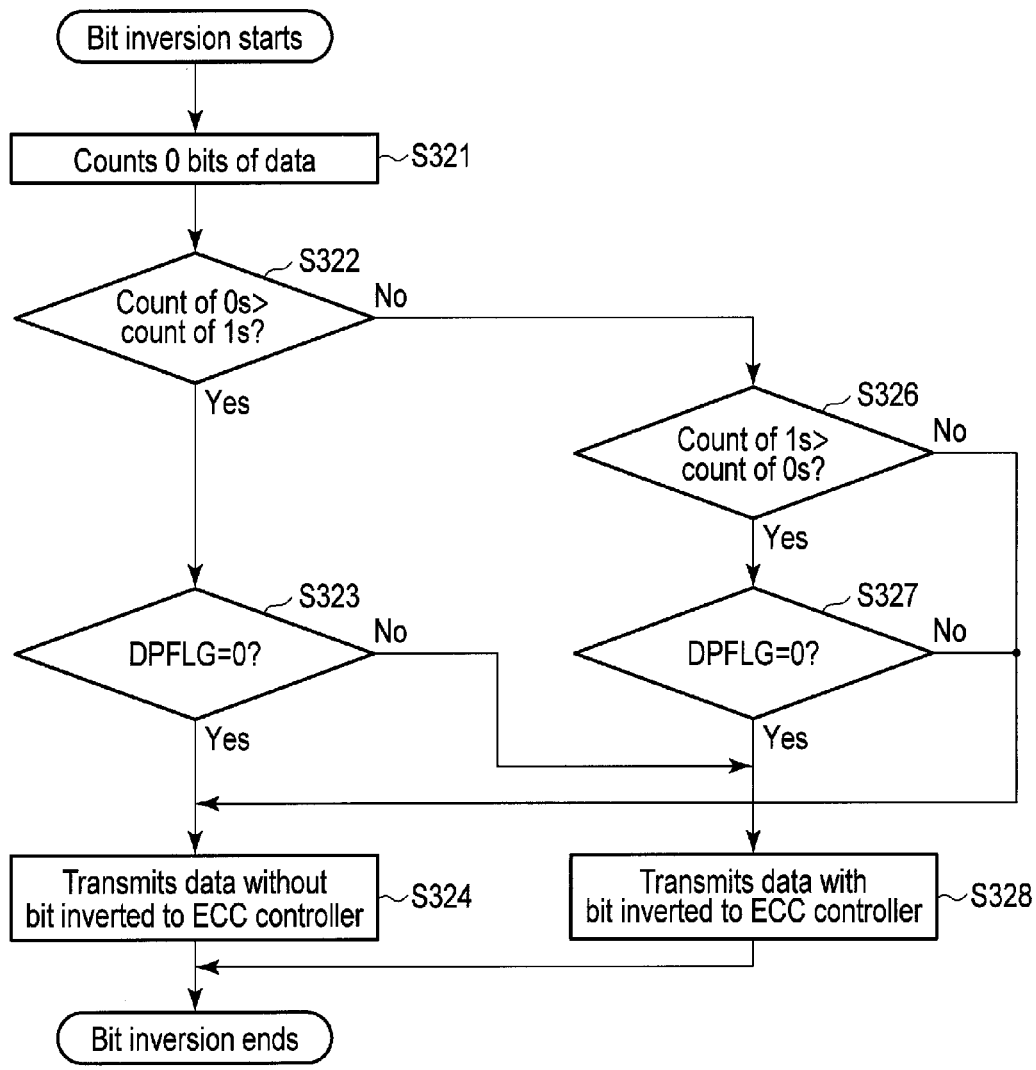
F I G. 28

| Input | | Output |
|---|---|---|
| 1111 1111 1111 1111b | → | 0000 0000 0000 0000b |
| 0000 1010 1111 1011b | → | 1111 0101 0000 0100b |
| 0000 0010 0101 0000b | → | 0000 0010 0101 0000b |
| 0000 0010 1111 1110b | → | 0000 0010 1111 1110b |

F I G. 29

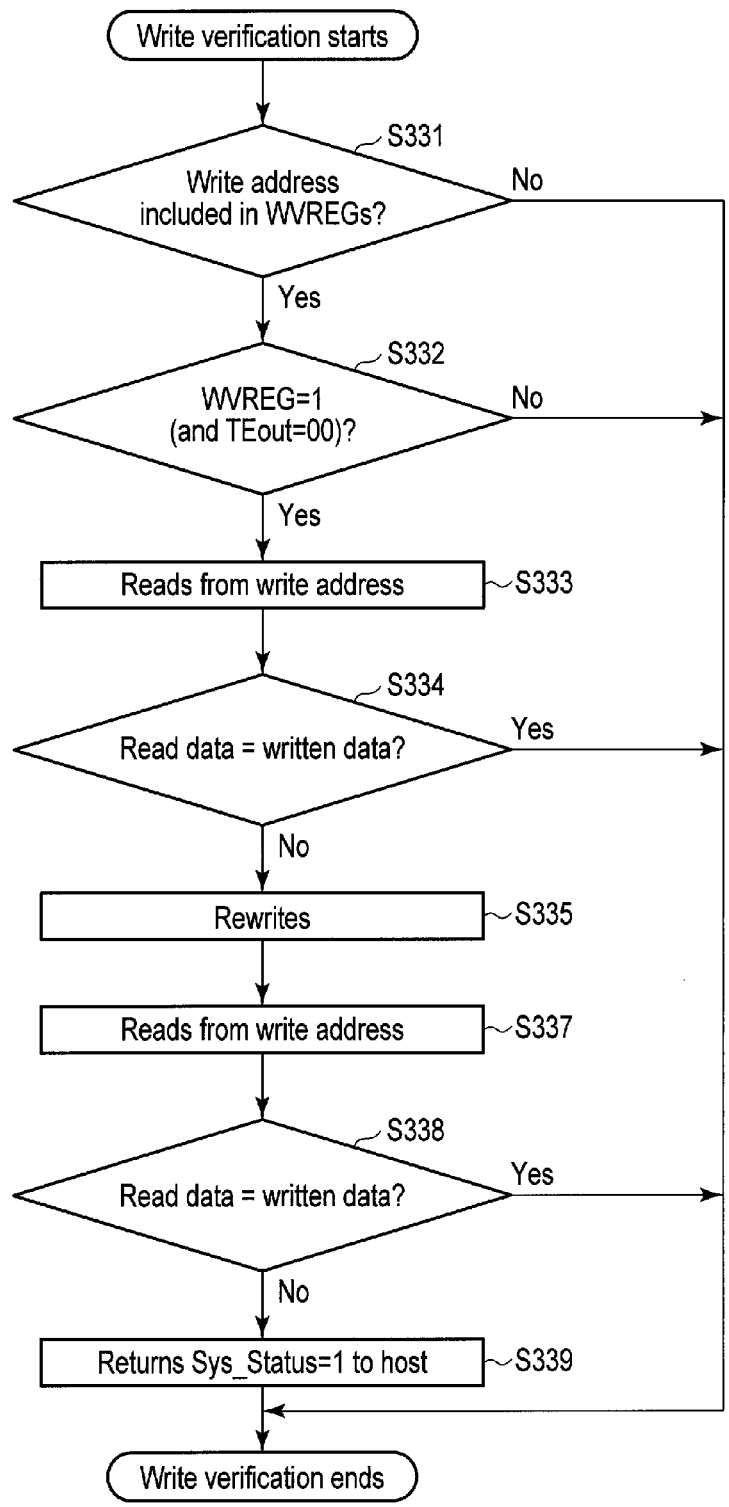
F I G. 30

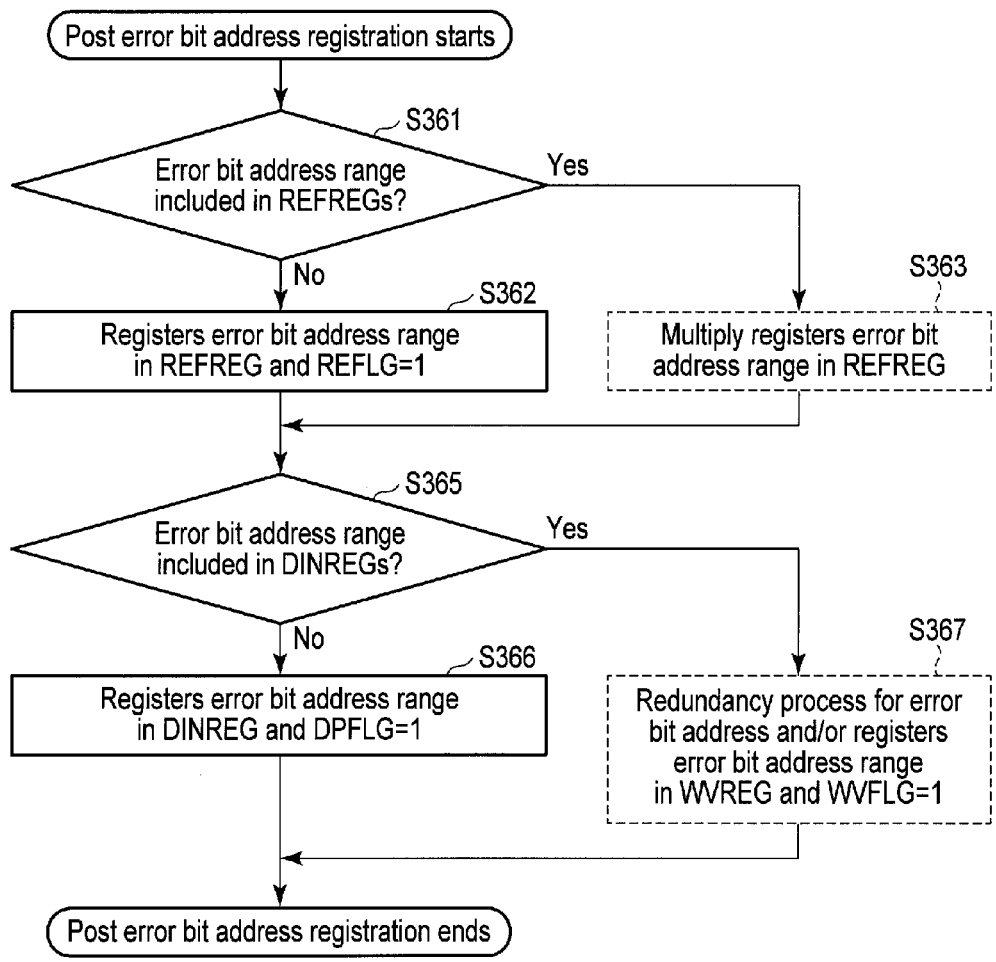
F I G. 32

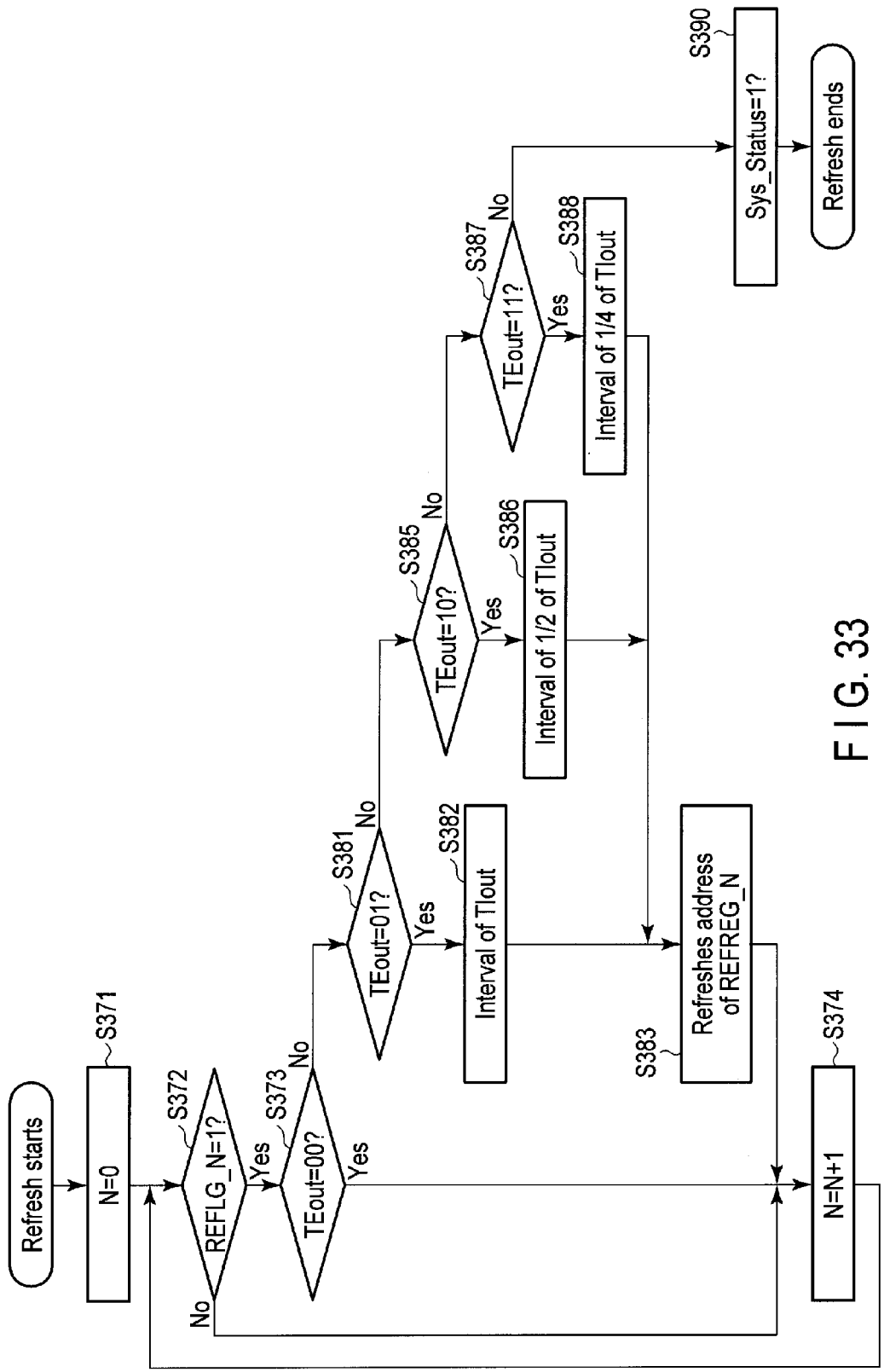
F I G. 33

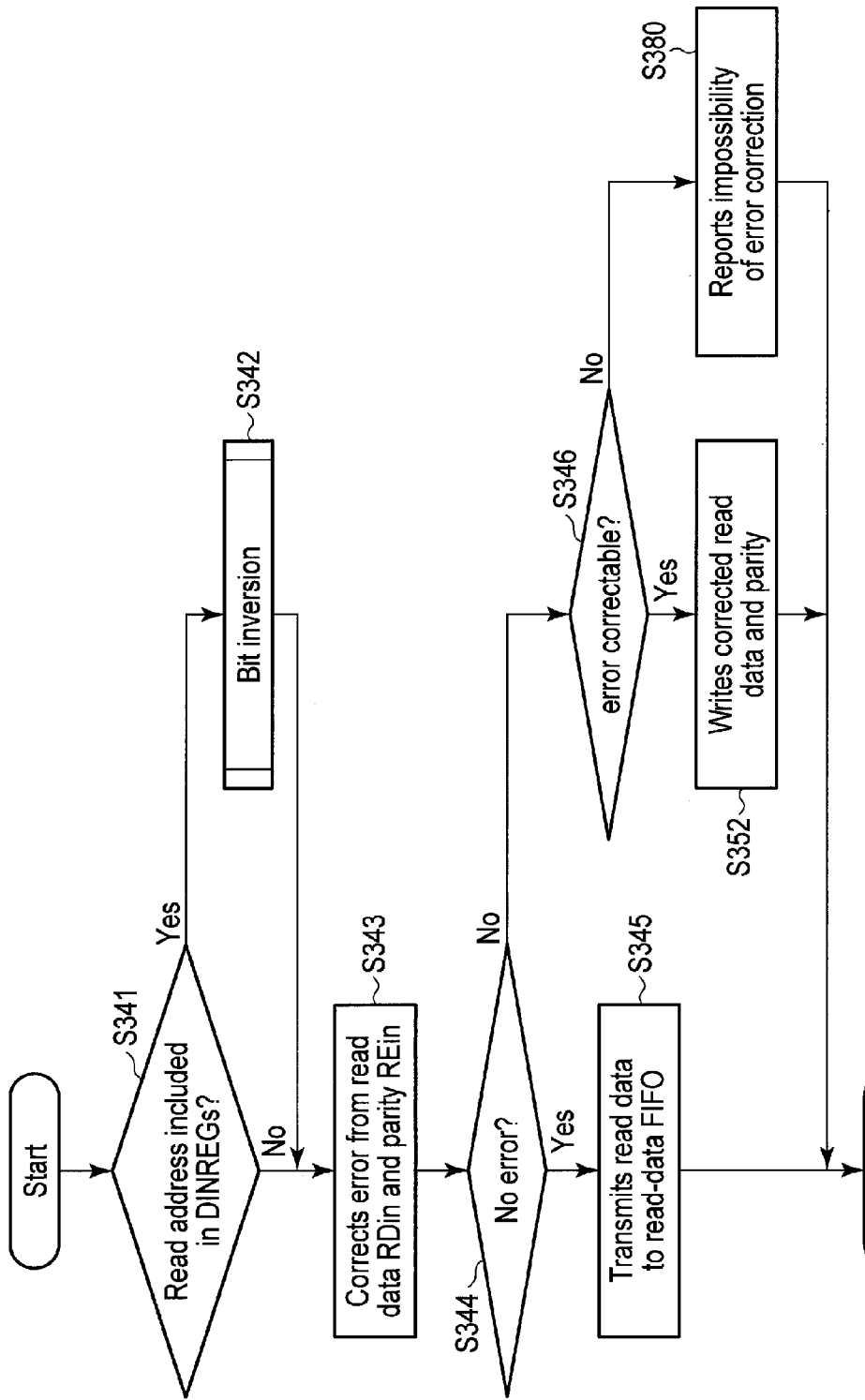
F I G. 34

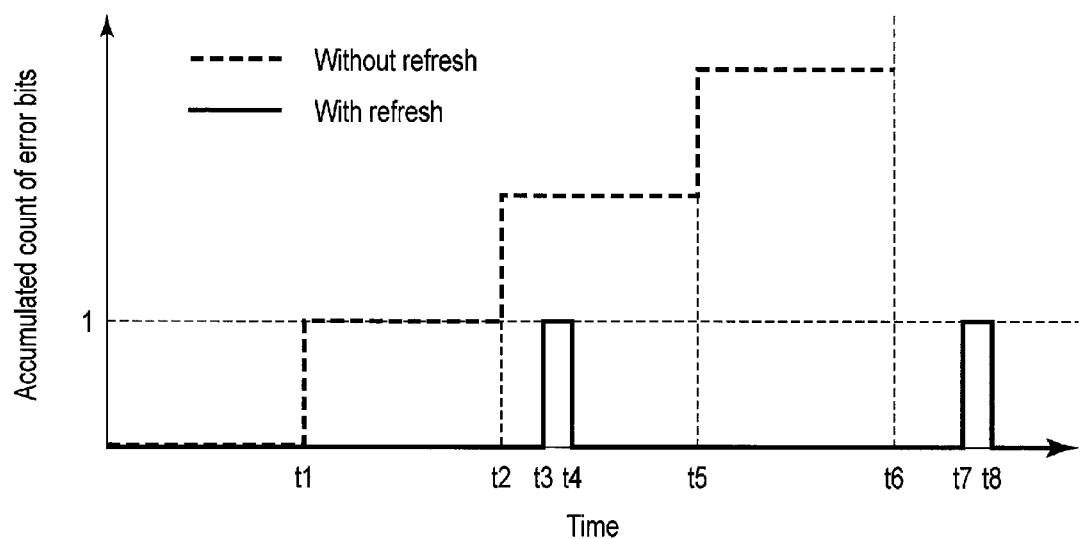
F I G. 35

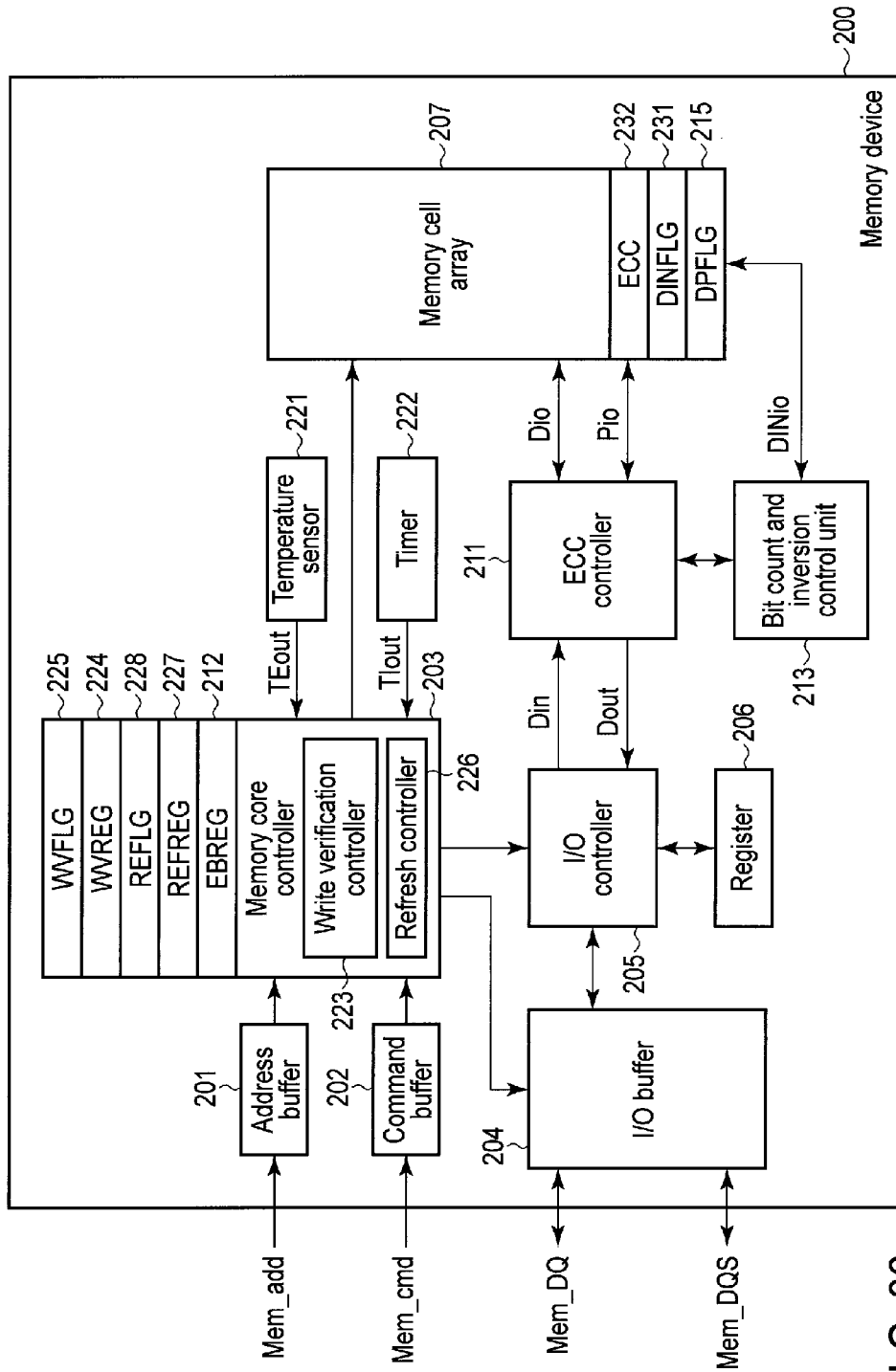
F I G. 36

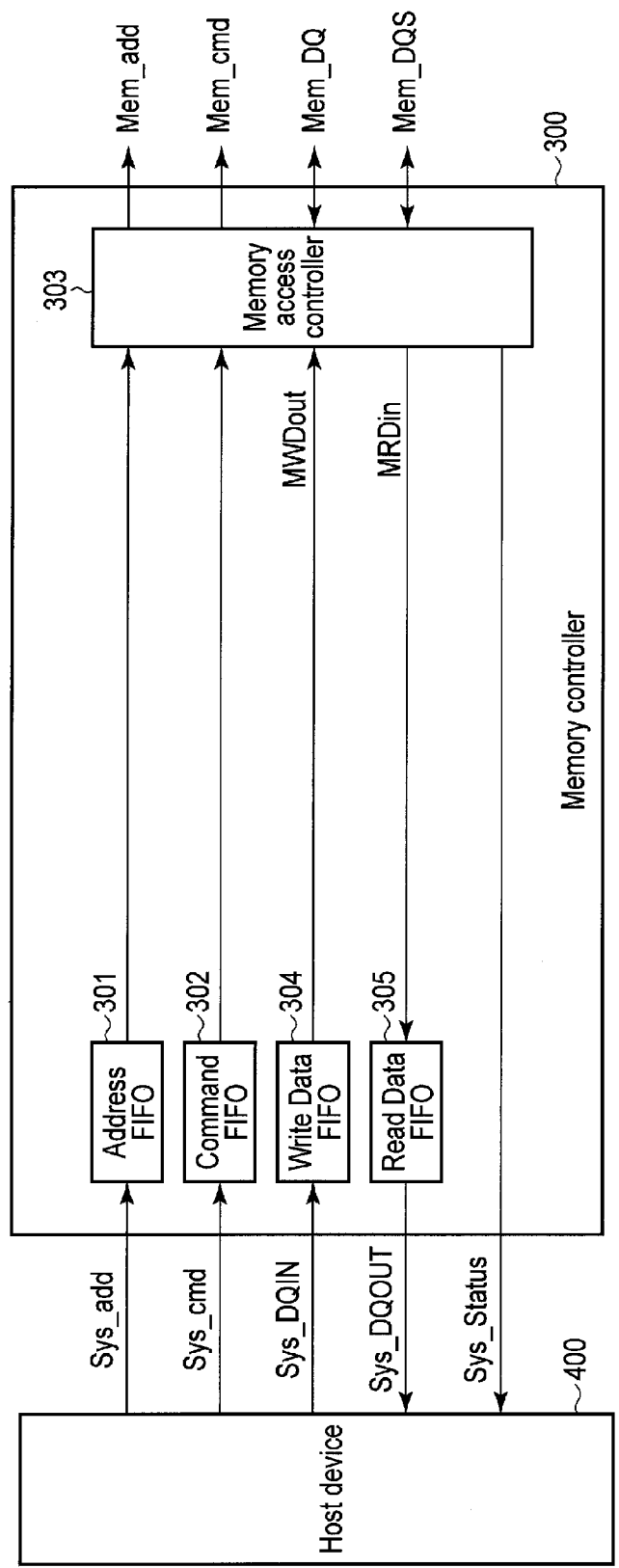
F I G. 37

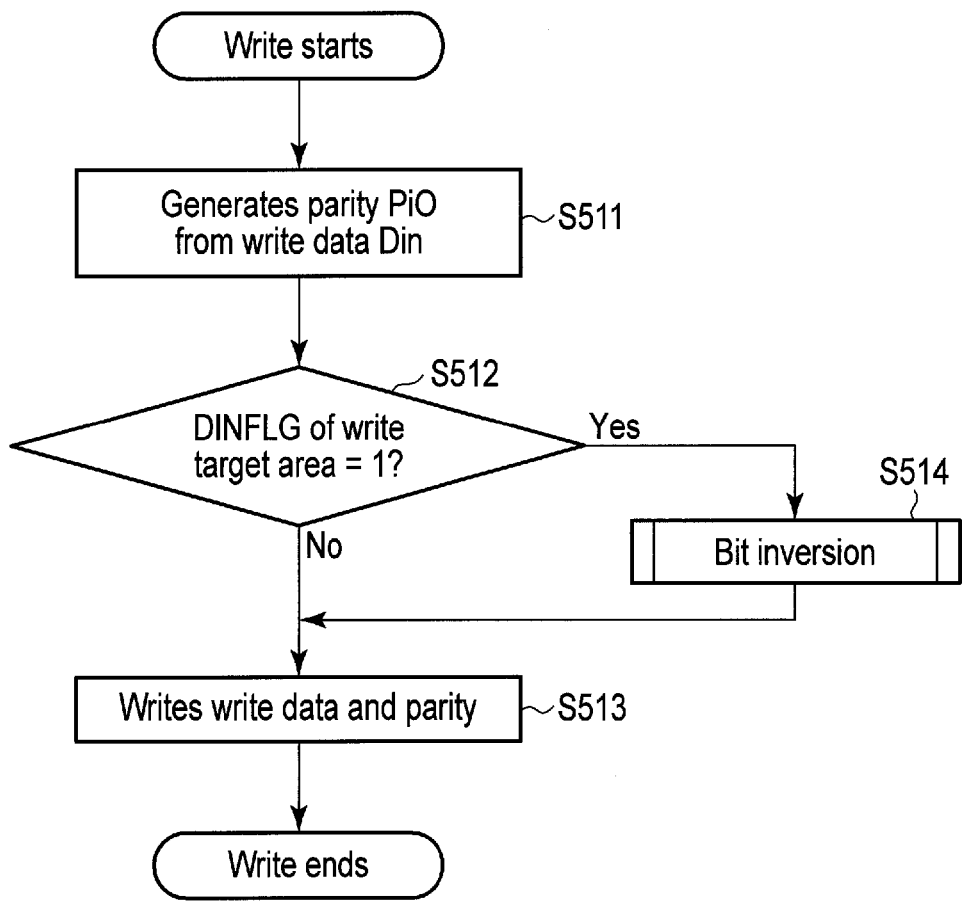
F I G. 38

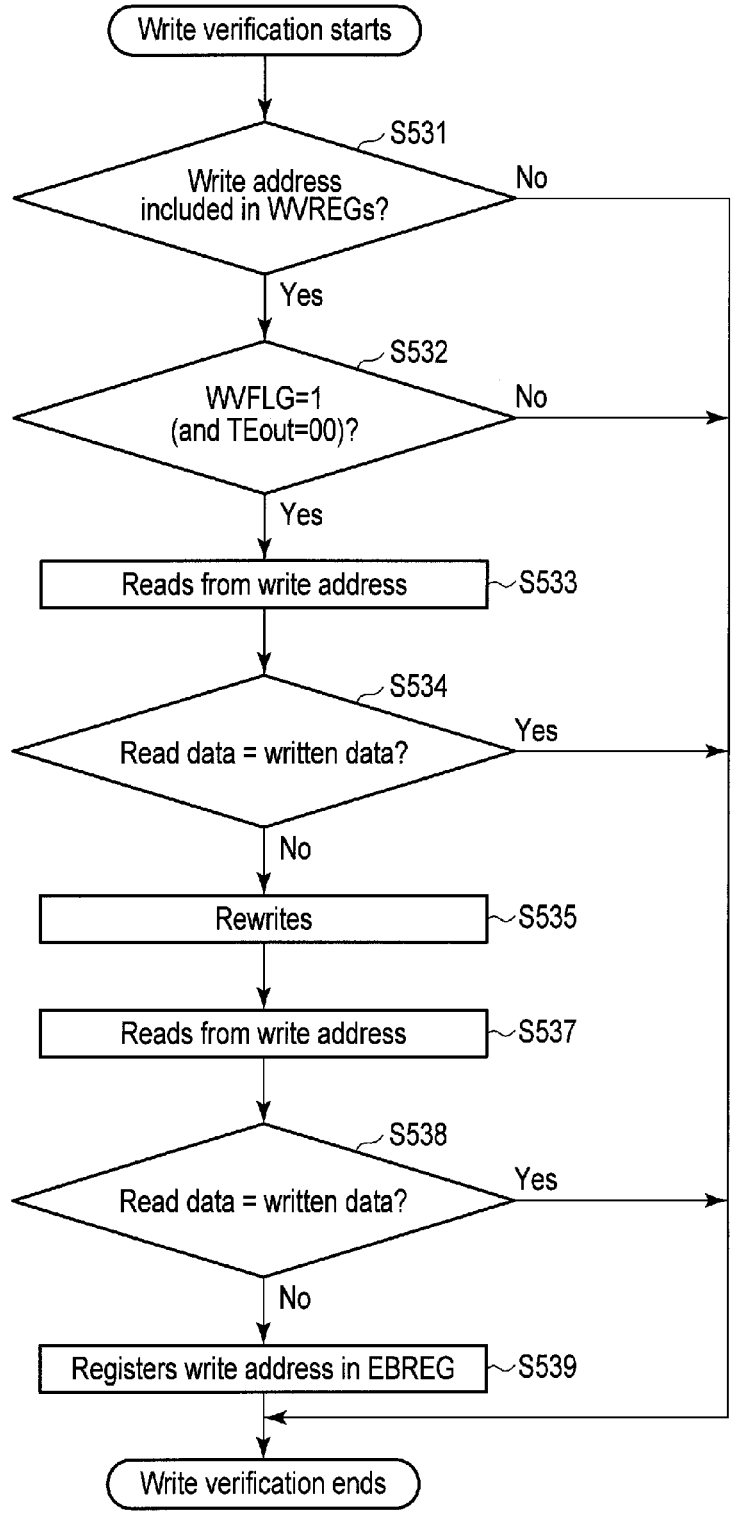
F I G. 39

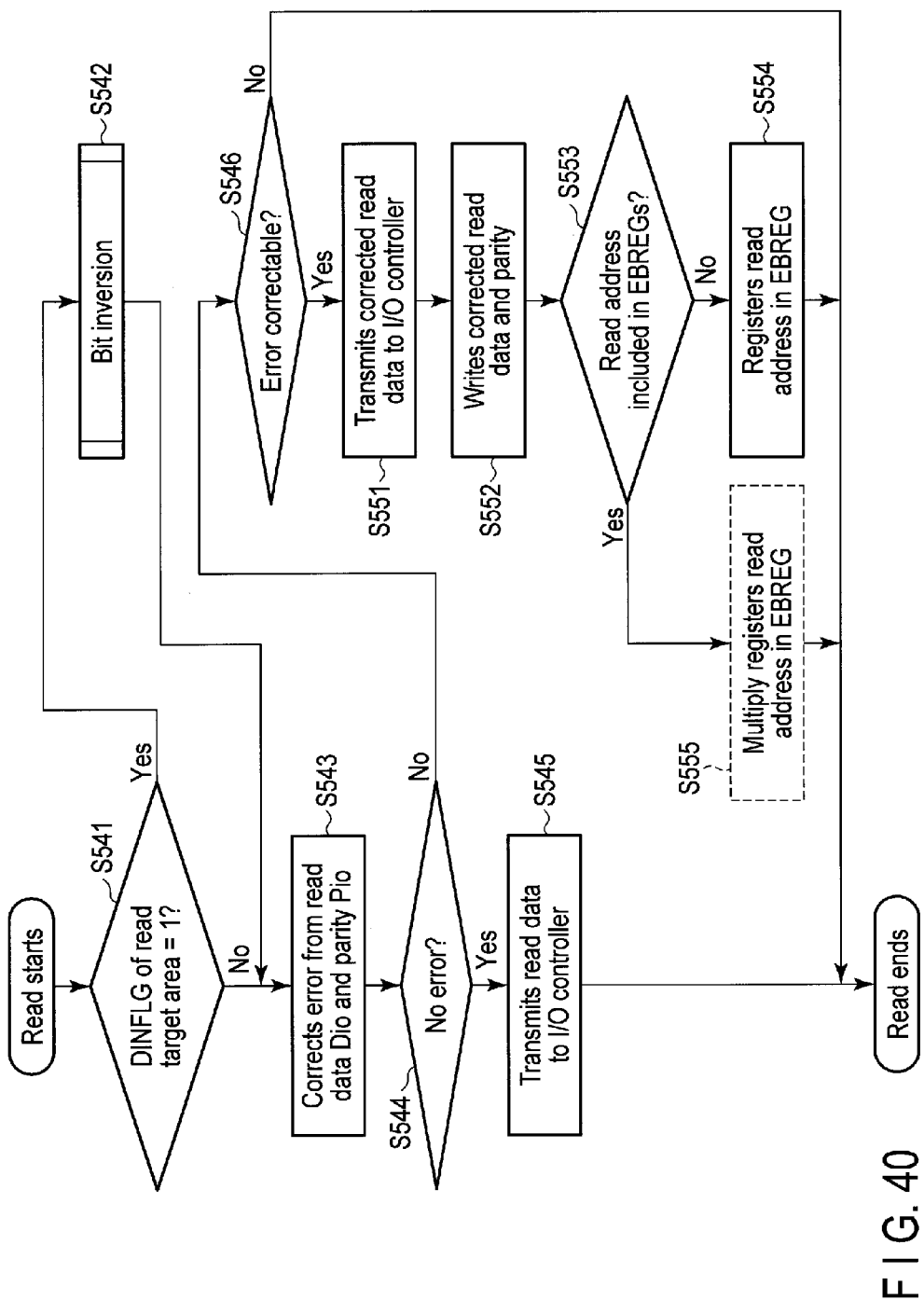
F I G. 40

MEMORY DEVICE

This application claims the benefit of U.S. Provisional Application No. 61/948,430, filed Mar. 5, 2014, the entire contents of which are incorporated herein by reference.

FIELD

Embodiments relate to a memory device.

BACKGROUND

Random access memories (RAMs) are widely used. Generally, the RAMs are required to operate at high speed.

BRIEF DESCRIPTION OF THE DRAWINGS

FIG. 1 illustrates functional blocks of a memory device of a first embodiment;

FIG. 2 illustrates an example of an MTJ element of the first embodiment;

FIG. 4 illustrates principles of parity bits and a check matrix used in the first embodiment;

FIG. 7 illustrates the flow according to the second embodiment;

FIG. 9 is a circuit diagram illustrating an example of an ECC and inversion circuit of a fourth embodiment;

FIG. 10 illustrates functional blocks of a memory controller of a sixth embodiment;

FIG. 11 illustrates functional blocks of a memory device of the sixth embodiment;

FIG. 12 illustrates indications by error bit registers of the sixth embodiment;

FIG. 13 illustrates indications by data inversion registers of the sixth embodiment;

FIG. 14 illustrates indications by data polarity flags of the sixth embodiment;

FIG. 15 illustrates outputs by a temperature sensor of the sixth embodiment;

FIG. 16 illustrates indications by write verification registers of the sixth embodiment;

FIG. 17 illustrates patterns of write verification by the sixth embodiment;

FIG. 18 illustrates indications by refresh registers of the sixth embodiment;

FIG. 19 illustrates patterns of refresh by the sixth embodiment;

FIG. 20 illustrates stages in which the memory controller of the sixth embodiment is operated, and operations according to stages;

FIG. 21 illustrates part of the flow of the sixth embodiment;

FIG. 22 illustrates the flow of a write test of the sixth embodiment;

FIG. 23 illustrates the flow of another write test of the sixth embodiment;

FIG. 24 illustrates the flow of a read test of the sixth embodiment;

FIG. 25 illustrates the flow of a data retention test of the sixth embodiment;

FIG. 26 illustrates an example of use of memory space of the memory device by the sixth embodiment and values of the registers and flags of the memory controller;

FIG. 27 illustrates the flow of a write of the sixth embodiment;

FIG. 28 illustrates the flow of data inversion of the sixth embodiment;

FIG. 29 illustrates an example of inputs and outputs by a bit count and inversion controller of the sixth embodiment;

FIG. 30 illustrates the flow of write verification of the sixth embodiment;

FIG. 32 illustrates the flow after registration to the error bit registers of the sixth embodiment;

FIG. 33 illustrates the flow of refresh of the sixth embodiment;

FIG. 34 illustrates a sub-flow, or part, of the refresh of the sixth embodiment;

FIG. 35 illustrates a relation between accumulation of error bits by the refresh of the sixth embodiment and time;

FIG. 36 illustrates functional blocks of a memory device of a seventh embodiment;

FIG. 37 illustrates functional blocks of a memory controller of the seventh embodiment;

FIG. 38 illustrates the flow of a write of the seventh embodiment;

FIG. 39 illustrates the flow of write verification of the seventh embodiment;

FIG. 40 illustrates the flow of a read of the seventh embodiment; and

DETAILED DESCRIPTION

Figure 3:
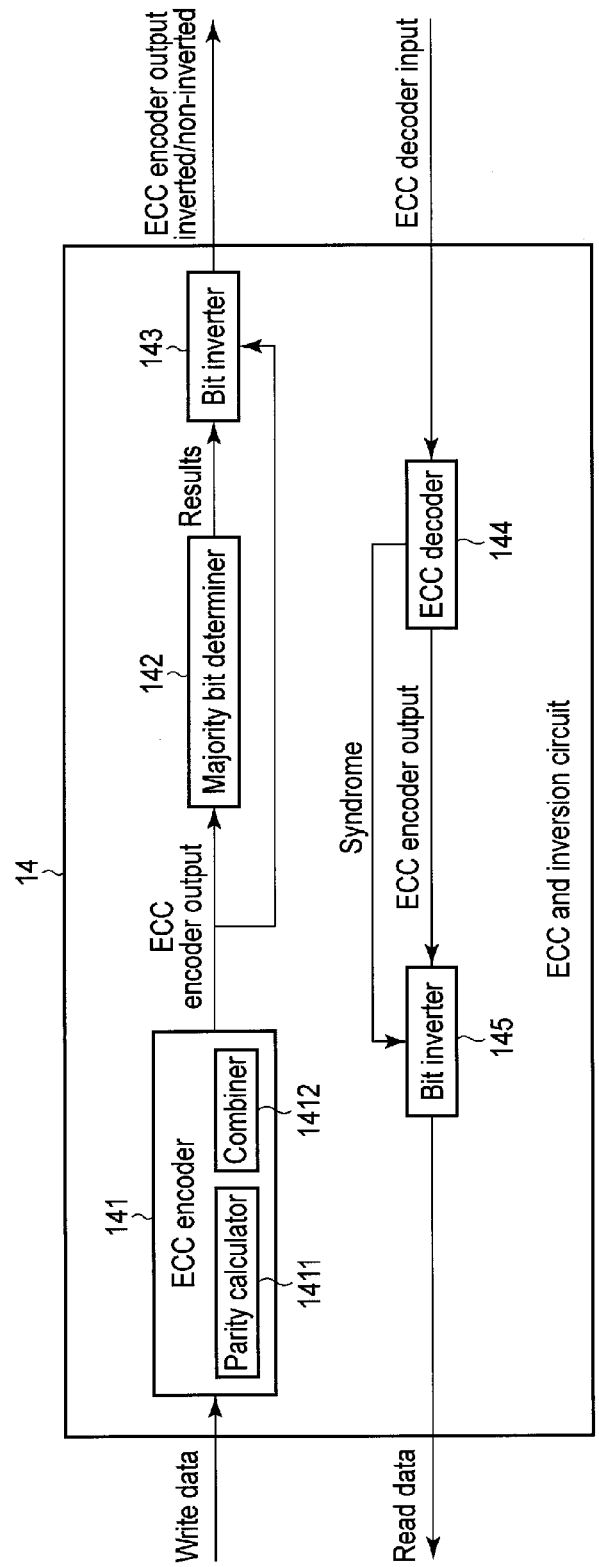
FIG. 3 illustrates functional blocks of an ECC and inversion circuit of the first embodiment.

According to one embodiment, a memory device comprises memory elements. An encoder generates a write data parity from write data to the memory elements. A decoder corrects an error of read data from the memory elements using a read data parity for the read data and a check matrix. An inverter maintains or inverts all bits of a received input. Calculation by the decoder using the read data, the read data parity, and the check matrix produces a first result when an error is not included in the read data, a second result when an error is included in the read data, a third result when an error is not included in the read data and all bits of the read data are inverted, and a fourth result when an error is included in the read data and all bits of the read data are not inverted.

Embodiments will now be described with reference to the figures. Components with substantially the same functionalities and configurations will be referred to with the same reference number and duplicate descriptions will be made only when required. The figures are schematic. The entire description for a particular embodiment also applies to another embodiment unless it is explicitly mentioned otherwise or obviously eliminated.

Each functional block illustrated in the figures can be implemented as hardware, software, or a combination of the both. For this reason, in order to clearly illustrate this interchangeability of hardware and software, descriptions will be made in terms of their functionality in general. Moreover, it is not essential for each functional block to be distinguished as illustrated. For example, some of the functions may be implemented by functional blocks different from those illustrated below. Furthermore, an illustrated functional block may be divided into functional sub-blocks. The embodiments are not limited by the specification of the particular functional blocks. Moreover, the order of steps of a flow illustrated in the figures can be varied unless it is explicitly or obviously stated otherwise.

First Embodiment

FIG. 1 illustrates functional blocks of a memory device 1 of the first embodiment. The memory device 1 is a RAM and formed as a single chip. The memory device 1 can be implemented as any type of RAM. The memory device 1 is configured to store data by any known scheme. Specifically, the memory device 1 is a dynamic RAM (DRAM), a magnetoresistive RAM (MRAM), a resistive RAM (Re-RAM), or a phase change RAM (PCRAM), for example. The first embodiment is not limited by the data storage scheme of the memory device 1. In accordance with the type of RAM, components and connections in sections of the memory device 1 known to the persons skilled in the art differ from each other. For this reason, FIG. 1 illustrates an example of components generally widely included in RAMs. The memory device 1, however, can have functional blocks different from those in FIG. 1 in accordance with the type of RAM, and the functional blocks included in the memory device 1 are not limited to the FIG. 1 example.

The memory device 1 is communicatively coupled to the memory controller 2 by a connection line 5. The connection line 5 includes a power line, a data bus, a command line, etc., for example. The memory controller 2 supplies a command to the memory device 1 and uses the command to control the memory device 1. Specifically, the memory controller 2 instructs the memory device 1 to write data, and to read particular data from the memory device 1.

The memory device 1 includes multiple banks 11 as illustrated in FIG. 1. FIG. 1 illustrates four banks 11_0 to 11_3. When features with an underscore and the following number at the end are not necessary to be distinguished from each other, description after the underscore is omitted, and the description with such omission applies to all features identified by the sign accompanied by the description after the underscore. Each bank 11 is configured to store data, and includes components such as memory cells 111 and various signal lines 112.

The details of the bank 11 also vary in accordance with the type of RAM as the memory device 1. For example, when the memory device 1 is the MRAM, the bank 11 is configured to store data in the memory cells 111 using the magnetoresistive effect. A memory cell of the MRAM includes a magnetic tunnel junction (MTJ) element, and stores data in a non-volatile manner in accordance with the state of magnetization. The MTJ element 31 includes an MTJ, and includes two magnetic layers FM and VM and a nonmagnetic layer NM therebetween as illustrated in FIG. 2. The magnetic layer FM has an invariable orientation of magnetization, and the magnetic layer VM has a variable orientation of magnetization. The magnetic layers FM and VM have magnetization easy axes (illustrated by the arrows) along the direction which penetrates the interfaces of the layers FM, NM and VM. The magnetic layers FM and VM may have magnetization easy axes along the interfaces of the layers FM, NM and VM. The layers FM, NM and VM are provided between the electrodes EA and EB. The element MTJ exhibits minimum and maximum resistances when the magnetization orientations of the magnetic layers FM and VM are parallel and antiparallel, respectively. The states which exhibit two different switchable resistances are assigned to the data of two values, respectively. For example, parallel and antiparallel magnetization orientations of the magnetic layers FM and VM are associated with the states where 0 and 1 bit are stored, respectively. When a write current IwP flows from the magnetic layer VM toward the magnetic layer FM, the magnetization orientations of the magnetic layers FM and VM become parallel (i.e., a 0-data write is performed to the element MTJ). In contrast, when a write current IwAP flows from the magnetic layer FM toward the magnetic layer VM, the magnetization orientations of the magnetic layers FM and VM become antiparallel (i.e., a 1-data write is performed to the element MTJ). Each of the currents IwP and IWAP is larger than the threshold Ic with a magnitude for switching the state of the element MTJ. A read current Ir is passed through the element MTJ to determine the resistance of the element MTJ. The read current Ir flows, for example in the same direction as the current for the 1-data write although it has a magnitude smaller than that for the 1-data write.

When the memory device 1 is the DRAM, the bank 11 is configured to store data in the memory cells 111 using charge storage. A memory cell of the DRAM includes a capacitor, and stores data in a volatile manner in accordance with electric charges stored by the capacitor.

When the memory device 1 is the ReRAM or PCRAM, the bank 11 is configured to store data in the memory cells 111 using resistance change. A memory cell of the ReRAM includes a variable resistance element of a metal oxide or a perovskite oxide. The resistance state is varied by changing a pulse width of a write pulse (a duration of pulse application) or an amplitude of the same (a current or voltage), or the polarity (a direction of application) of a write pulse. A memory cell of the PCRAM includes a variable phase element (variable resistance element) with a chalcogenide, etc. The resistance state is varied with the heat produced by a write current to make a film of the phase change element crystal or amorphous state.

The signal lines 112 include bit lines, word lines, etc., for example. The banks 11 further include controllers (not shown) for respective banks.

The memory device 1 further includes accompanying circuits 12_0 to 12_3, which are provided for the banks 11_0 to 11_3, respectively. Each accompanying circuit 12 controls the corresponding bank 11, and includes, for example, a read circuit and a write circuit. The read circuit and write circuit include drivers, decoders, page buffers, sense amplifiers, etc. A decoder selects a memory cell 111 specified by an address signal from the memory controller 2. A page buffer temporarily stores data from or to the corresponding bank 11. A read circuit distinguishes data from a selected memory cell 111. A write circuit writes specified data to a selected memory cell 111.

The memory device 1 further includes a data path controller 13, an error correction code (ECC) and the inversion circuit 14, an input/output circuit 15, and a controller 16. The registers 18 will be described in the fifth embodiment. The data path controller 13 is coupled between the accompanying circuits 12 and the ECC and inversion circuit 14. The data path controller 13 is coupled to all the accompanying circuits 12, and includes signal lines (or, a bus), and couples one or more of the accompanying circuits 12 to the ECC and inversion circuit 14. The input/output circuit 15 controls transmission of a signal between the memory device 1 and the memory controller 2. For example, the input/output circuit 15 supplies write data from the memory controller 2 to the ECC and inversion circuit 14, and outputs read data from the ECC and inversion circuit 14 to the memory controller 2. The input/output circuit 15 supplies a command and an address signal from the memory controller 2 to the controller 16. The controller 16 includes components, such as a command decoder, a latch, a buffer, and a voltage generator, and controls the components of the memory device 1 in accordance with received commands and address signals.

Referring to FIG. 3, the ECC and inversion circuit 14 includes an ECC encoder 141, a majority bit determiner 142, a bit inverter 143, an ECC decoder 144, and a bit inverter 14. FIG. 3 illustrates functional blocks of the ECC and inversion circuit of the first embodiment. The ECC encoder 141 receives write data (or, a string of bits of 1 or 0), generates an error correction code (or, parity bits) from the write data in accordance with the error correction code generation rules predefined in accordance with a principle in units of segments (ECC words) of the write data, which will be described later, and outputs a set of write data and parity bits (an ECC encoder output). More specifically, the ECC encoder 141 includes a parity calculator 1411 and a combiner 1412. The parity calculator 1411 generates parity bits from received write data in accordance with predefined error correction code generation rules. The combiner 1412 concatenates write data and parity bits to generate an ECC encoder output.

The majority bit determiner 142 determines which of logical 0 bits and logical 1 bits in an ECC encoder output outnumber the other. The bit inverter 143 receives the ECC encoder output, and outputs it as it is or inverts the values of all bits to output a bit-inverted ECC encoder output based on the result from the majority bit determiner 142. The bit-inverted ECC encoder is referred to as an inverted ECC encoder output.

During a read, the ECC decoder 144 receives data from a bank 11. The data from the bank 11 is received by the ECC decoder 144, and, therefore, is also hereinafter referred to as an ECC decoder input. The ECC decoder input includes a set of data requested to be read (or, read data) and parity bits, such as the ECC encoder output. The ECC decoder input includes the ECC encoder output or the inverted ECC encoder output, and may further contain an error. Particular data (for example, an ECC encoder output) may be referred to, in order to be more clearly distinguished from the bit-inverted version thereof (for example, an inverted ECC encoder output), after the term "non-inverted".

The ECC decoder 144 calculates a syndrome from the ECC decoder input and a check matrix predefined in accordance with the rule to be described later in units of ECC words, uses the syndrome to correct an error of the read data in the ECC decoder input, and outputs an ECC decoder output. The ability of the ECC decoder 144 to correct an error is determined based on an error correction code, and is 1 bit, for example.

The bit inverter 145 receives the ECC decoder output, and receives the syndrome from the ECC decoder 144. The bit inverter 145 outputs the ECC decoder output as it is, or inverts the values of all bits in the ECC decoder output to output a bit-inverted ECC decoder output based on the syndrome. The output of the bit inverter 145 is the read data. The ECC and inversion circuit 14 will be described in detail later.

FIG. 4 illustrates the principle of the ECC and inversion circuit 14 of the first embodiment, especially the parity bits and check matrix used by the ECC encoder 141 and ECC decoder 144. $\omega$ is a code word, and corresponds to a non-inverted ECC encoder output which was written in a bank 11 and then read from the bank 11. $\omega'$ is the bit string of the code word $\omega$ with all the bits inverted, is hereinafter referred to as an inverted code word, and corresponds to an inverted ECC encoder output which was written in a bank 11 and then read from the bank 11. $H^T$ represents the check matrix and is executed in the ECC decoder 144 for error correction. "s" is a syndrome and "e" represents an error which is added to the inverted or non-inverted ECC encoder output. The parity bits and check matrix used by the ECC encoder 141 and ECC decoder 144 are formed to satisfy formulae (1) to (4). Types of parity bits include any types of code as long as it satisfies formulae (1) to (4) in conjunction with the check matrix used in combination. For example, the parity bits are a Hamming code, a BCH code, or a Reed Solomon code, etc.

The formula (1) represents the general principle of error correction. Specifically, the check-matrix $H^T$ is formed as generating a zero matrix by the check-matrix $H^T$ and a code word $\omega$ which includes no error. In contrast, as represented by formula (3), when an error exists in a code word $\omega$ (=$\omega$+e), the syndrome obtained by multiplying this code word with an error and the check-matrix $H^T$ is a matrix $eH^T$. The parity bits and the check-matrix $H^T$ of the first embodiment are configured to also satisfy formulae (2) and (4). The formula (2) illustrates that the product of an inverted code word $\omega'$ and check-matrix $H^T$ is a matrix other than a zero matrix (non-zero matrix). An example of the non-zero matrix is a matrix with all components being 1. Moreover, formula (4) illustrates that when an error exists in an inverted code word $\omega'$ (=$\omega'$+e), the syndrome obtained by multiplying this inverted code word with an error and the check matrix is $1+eH^T=/eH^T$. Note that, in this specification, the sign "/" represents the bar for a sign that follows. Therefore, $eH^T$ and $/eH^T$ are different matrixes and are independent from each other.

Defining the parity bits and check-matrix $H^T$ which satisfy the above-mentioned formulae (1)-(4) allows the following cases to be distinguished from each other. Specifically, as can be understood from formulae (1) and (2), it is possible to distinguish whether an ECC decoder is a code word $\omega$ or an inverted code word $\omega'$, i.e., whether an ECC decoder input originates from a non-inverted ECC encoder output or an inverted ECC encoder output. Furthermore, as can be seen from the formulae (3) and (4), it is possible to specify a case of a code word $\omega$ including an error and a case of an inverted code word $\omega'$ including an error. In addition, no matter whether an ECC decoder input originates from a non-inverted ECC encoder output or an inverted ECC encoder output, the error can be corrected with the parity bits.

The ECC and inversion circuit 14 will now be further described. The ECC and inversion circuit 14 operates as follows when it receives write data. The write data is received by the parity calculator 1411. The parity calculator 1411 calculates parity bits from the write data in accordance with the rules described with reference to FIG. 4. The combiner 1412 concatenates the parity bits with the write data to generate an ECC encoder output.

The ECC encoder output is received by the majority bit determiner 142. The majority bit determiner 142 compares the count of the logical 0 bits with the count of the logical 1 bits in the ECC encoder output to determine which outnumbers the other. The result of the determination is received by the bit inverter 143. Based on the received result, the bit inverter 143 outputs the ECC encoder output as it is or as an inverted ECC encoder output. Which of the ECC encoder output and inverted ECC encoder output the bit inverter 143 outputs is based on the application example of the memory device 1, which will be described in detail later.

The majority bit determiner 142, in addition to determining the majority of bits in the ECC encoder output, may use the result of the determination to determine inversion or non-inversion of the bits in the ECC encoder output. The majority bit determiner 142 then instructs the bit inverter 143 to invert or not invert the bits. The bit inverter 143 outputs the non-inverted or inverted ECC encoder output in accordance with the instruction.

The output from the bit inverter 143, whether it is the ECC encoder output or the inverted ECC encoder output, is supplied to a write-target bank 11 through the data path controller 13. The write-target bank 11 writes the non-inverted or inverted ECC encoder output in the memory cells 111.

When instructed to read particular data, the memory device 1 reads this data and the read data is supplied to the ECC and inversion circuit 14. The read data is received by the ECC decoder 144 as an ECC decoder input. As described above, the ECC decoder input includes the ECC encoder output or the inverted ECC encoder output, and may include an error as well. Even if an ECC encoder output with all its bits inverted has been written in the memory cells 111 as it is, it can be determined that the ECC encoder output is the inverted version using the check matrix $H^T$, as is clear from formula (2). Specifically, the ECC decoder 144 multiplies the ECC decoder input, the non-inverted or inverted state of which is unknown, with the check matrix $H^T$ to calculate a syndrome. When the syndrome of formula (4) is obtained, the data from the memory cells 111 can be specified as originating from the inverted ECC encoder output. These regards and reads of data will be described in the third embodiment.

Examples of the reference for whether ECC encoder outputs should be bit-inverted or not will now be described. For example, when 1 bits in all ECC words of the ECC encoder output outnumber 0 bits (when an ECC encoder output is 1-rich), the bit inverter 143 inverts all the bits of this ECC encoder output. Bit of 1 is represented with the logical high level on the data path controller 13. Therefore, forming the state of the logical high level on the signal line of the data path controller 13 requires a larger voltage than that of the logical low level, which in turn consumes more power. Based on this, bits of the 1-rich ECC encoder output can be inverted to suppress the power consumption in the data path controller 13. When the ECC encoder output is 0-rich, the bit inverter 143 does not invert the bits of the ECC encoder output.

Alternatively, the inversion of the bits of the ECC encoder output is determined based on which of a write of 0 and 1 bit requires the larger voltage. For example, a particular kind of RAM has different power consumptions for the 0 bit write and the 1 bit write. For example, when the memory device 1 is an MRAM, the write to make the magnetization orientations of the magnetic layers VM and FM anti-parallel (a 1-data write) requires a larger voltage than required by the write to make the magnetization orientations of the magnetic layers VM and FM parallel (a 0-data write). Based on this, when the ECC encoder output includes more bits which result in the 1-data writes, the bit inverter 143 inverts the bits of the ECC encoder output. For example, when the ECC encoder output is 1-rich, the bit inverter 143 inverts the bits of the ECC encoder output. When the ECC encoder output is 0-rich, the bit inverter 143 does not invert the bits of the ECC encoder output. With such an inversion criterion, the power consumption for writes by the memory device 1 can be suppressed. Moreover, the write which needs a larger voltage leads to applying a larger voltage to the write-target memory cells 111. Application of a large voltage to the memory cells 111 reduces the life of the memory cells 111. Therefore, using a write with a smaller voltage also leads to making the life of the memory device 1 longer.

Alternatively, when the memory device 1 is an MRAM, the inversion of the bits of the ECC encoder output is determined based on the direction of the read current. In the MRAM, current is used for both reads and writes, and therefore the read current may invert the data of read-target memory cells 111 (or, a read disturb may occur). For example, when the read current Ir flows in the same direction as the write current IwAP for the 1-data write as described above, supply of the read current Ir corresponds to a weak 1-data write. A large write current, however, is necessary to switch the magnetization orientations of elements MTJ into anti-parallel from parallel (i.e., to 1-data-write), and, therefore, the magnetization of magnetic layers VM is not switched easily. Then, inversion of the bits of the ECC encoder outputs is determined so that more data items harder to be inverted by the read current Ir are stored in the memory cells 111. For example, when the ECC encoder output is 0-rich, the bit inverter 143 inverts the bits of the ECC encoder output. When the ECC encoder output is 1-rich, the bit inverter 143 does not invert the bits of the ECC encoder output. With such an inversion criterion, erroneous writes by the supply of the read current Ir can be suppressed.

What criterion for determination for inverting bits of the ECC encoder output including the example described above is adapted can be based on the main usages of the memory device 1. For example, for the use with low power consumption being desired and frequent occurrence of writes, a determination criterion which leads to suppression of the power consumption (and extension of the life) is adopted. In contrast, for the use which leads to frequent occurrence of reads, a determination criterion which leads to suppression of erroneous writes due to supply of the read current Ir is adopted.

Figure 5:
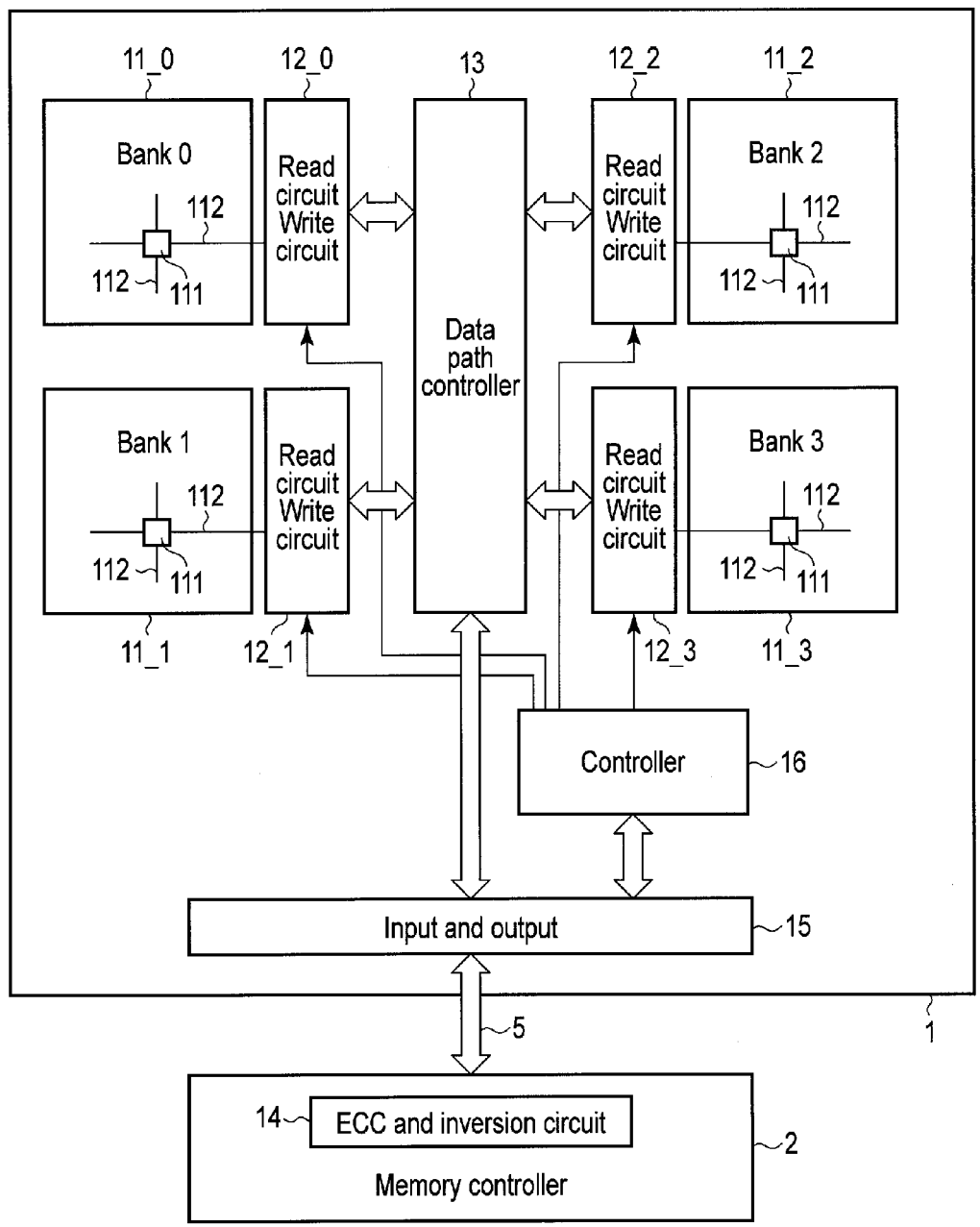
FIG. 5 illustrates functional blocks of a memory device and a memory controller of another example of the first embodiment.

FIG. 1 illustrates an example of the ECC and inversion circuit 14 in the memory device 1. The ECC and inversion circuit 14, however, may be outside the memory device 1 as illustrated in FIG. 5. FIG. 5 illustrates functional blocks of another example of the first embodiment, and illustrates functional blocks of the memory device and the memory controller. The ECC and inversion circuit 14 is provided in the memory controller 2 instead of in the memory device 1. The memory device 1 and the memory controller 2 are made as separate chips. The memory controller 2 controls the memory device 1 in accordance with signals from outside (for example, from a host device). The ECC and inversion circuit 14 operates as described above to instruct the memory device 1 to write a non-inverted or inverted ECC encoder output as write data in a particular area of a particular bank 11. The write data flows in the connection line 5, and is received by the input/output circuit 15 of the memory device 1. The input/output circuit 15 supplies the write data to the data path controller 13 as it is in accordance with the control of the controller 16. The controller 16 writes the write data passing through the data path controller 13 in the write-target memory cells 111.

As described, in the first embodiment, the ECC and inversion circuit 14 outputs non-inverted or inverted ECC encoder outputs to the data path controller 13 in accordance with which of the counts of logical 0 bits and 1 bits in the ECC encoder outputs outnumber the other. The non-inverted or inverted ECC encoder outputs flow through the data path controller 13 and are written as they are in the write-target memory cells 111. For this reason, according to the type of the memory device 1 and the adopted criterion for the inversion, at least one of suppression of the power consumed by the memory device 1 and suppression of erroneous writes can be obtained. Moreover, the use of the parity bits and check matrix defined as described above allows for both determinations that the data from the memory cells 111 were written with the bits inverted and correction of an error therein.

Second Embodiment

The second embodiment relates to another example of the ECC and inversion circuit 14.

Figure 6:
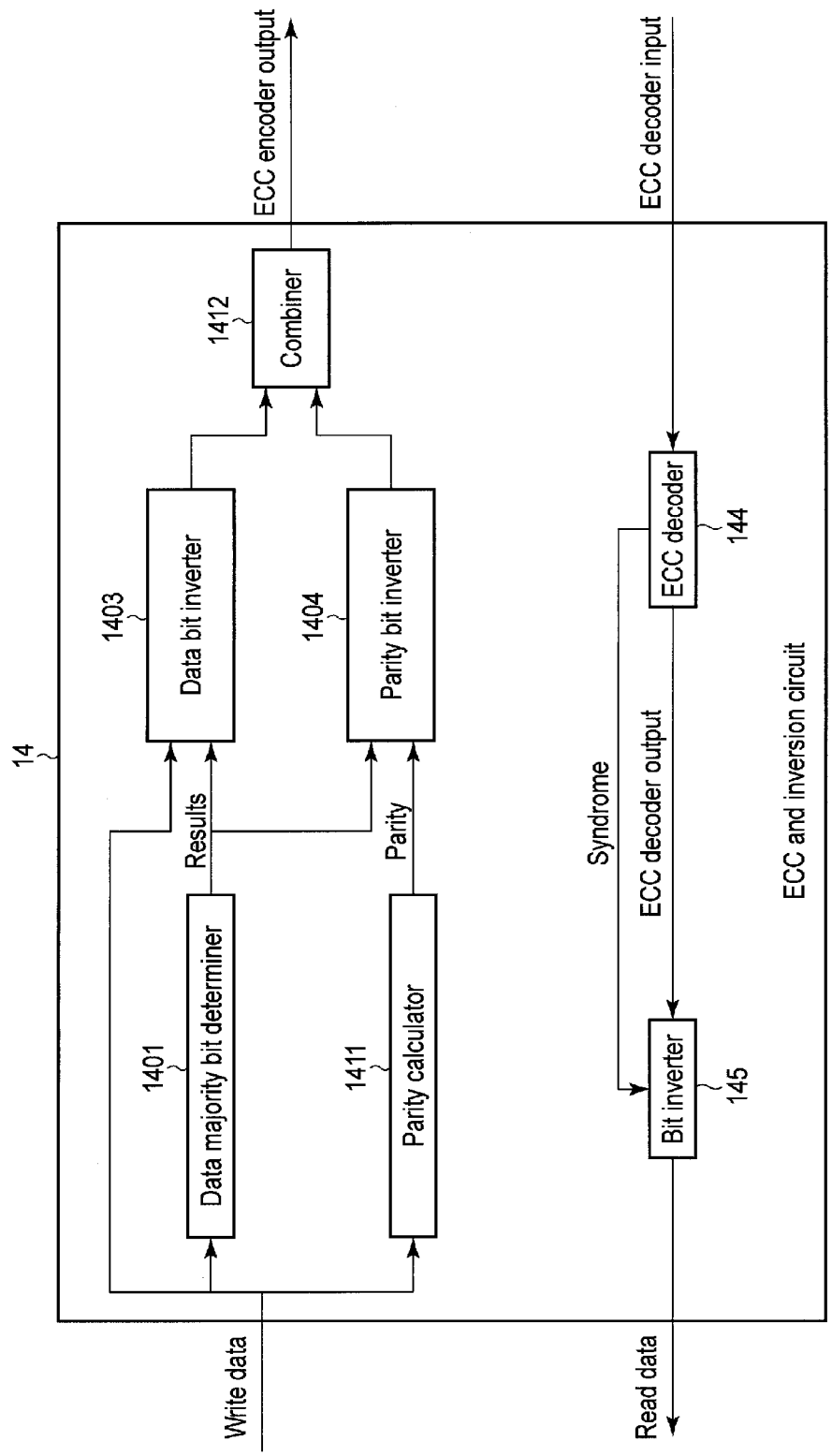
FIG. 6 illustrates functional blocks of an ECC and inversion circuit according to a second embodiment.

FIG. 6 illustrates functional blocks of the ECC and inversion circuit 14 according to the second embodiment. The ECC and inversion circuit 14 includes an ECC decoder 144, a data majority bit determiner 1401, a parity calculator 1411, a data bit inverter 1403, a parity bit inverter 1404, and a combiner 1412 as illustrated in FIG. 6.

The ECC and inversion circuit 14 receives write data. The write data is received by the data majority bit determiner 1401, parity calculator 1411, and data bit inverter 1403. The data majority bit determiner 1401 compares the count of the logical 0 bits in the write data with the count of the logical 1 bits, and determines which outnumbers the other. The result of the determination is received by the data bit inverter 1403. Based on the received result, the data bit inverter 1403 outputs the write data as it is or inverts all bits of the write data (all data bits) to supply bit-inverted write data to the combiner 1412. The version of write data with all the bits inverted is referred to as inverted write data.

As to whether the bit inverter 1403 outputs the write data and inverted write data, the entire description for the criteria for inversion by the bit inverter 143 of the first embodiment is applicable, although the bit inverter 143 and the data bit inverter 1403 differ in their inputs. For example, when the write data includes more bits which require a larger voltage for transmission through the data path controller 13, the data bit inverter 1403 inverts the bits of the write data; otherwise, does not invert the bits of the write data. Alternatively, it inverts the bits of the write data when the write data includes more bits which require a larger voltage for the write, and otherwise does not invert the bits of the write data. Still alternatively, it inverts the bits of the write data when the write data includes more bits which will highly likely result in unintentional inversion of stored data, and otherwise does not invert the bits of the write data.

The parity calculator 1411 supplies parity bits to the parity bit inverter 1404. The parity bit inverter 1404 also receives the result of the comparison of which of the logical 0 bit and 1 bit counts in the write data outnumbers the other from the data majority bit determiner 1401. The parity bit inverter 1404 determines whether it will invert the parity bits or not in accordance with the same criteria for determination as the data bit inverter 1403. Specifically, when the data bit inverter 1403 inverts the bits of the write data, the parity bit inverter 1404 inverts all the parity bits to output the version of the parity bits with all the bits inverted, which will be referred to as an inverted parity. When the data bit inverter 1403 does not invert the bits of the write data, the parity bit inverter 1404 outputs the parity as it is.

The data majority bit determiner 1401 may be responsible for using the result of the determination to determine inversion or non-inversion of write data bits and parity bits in addition to the determination of majority bits. In addition, the data majority bit determiner 1401 instructs the data bit inverter 1403 and parity bit inverter 1404 to invert or non-invert the bits. The data bit inverter 1403 and the parity bit inverter 1404 output non-inverted or inverted write data and non-inverted or inverted parity in accordance with the instruction, respectively.

The outputs of the data bit inverter 1403 and the parity bit inverter 1404 are received by the combiner 1412. The combiner 1412 concatenates the write data and the parity to generate an ECC encoder output, or concatenates the inverted write data and the inverted parity to generate an ECC encoder output.

FIG. 7 illustrates the flow according to the second embodiment, and in particular illustrates the flow of operation by the ECC and inversion circuit 14. In step S1, write data is received by the ECC and inversion circuit 14. In step S2, the data majority bit determiner 1401 compares the logical 0 bit count with the logical 1 bit count in the write data to determine which of the two outnumbers the other. In accordance with the result of the determination, inversion or maintenance of the data bits and parity bits is determined. The set of the data bit inverter 1403 and the parity bit inverter 1404, or the data majority bit determiner 1401 alone determines the maintenance or inversion of the write data and parity bits. When the write data bits and the parity bits should be maintained, the flow shifts to step S3. In step S3, the data bit inverter 1403 and the parity bit inverter 1404 output the write data and the parity as they are, respectively.

In contrast, when the inversion of the write data bits and the parity bits are determined in step S2, the flow shifts to step S4. In step S4, the data bit inverter 1403 and the parity bit inverter 1404 output inverted write data and inverted parity, respectively.

As described, in the second embodiment, the ECC and inversion circuit 14 outputs the ECC encoder output including the non-inverted write data and the non-inverted parity or the ECC encoder output including the inverted write data and the inverted parity in accordance with which the logical 0 bit count and 1 the bit count in the write data outnumbers the other. The maintenance of the write data or inversion of the bits thereof can be appropriately determined in accordance with the type of the memory device 1 to allow for at least one of suppression of the power consumed by the memory device 1 and suppression of erroneous writes as in the first embodiment. Furthermore, the use of the parity and the check matrix defined as in the first embodiment allows for both determination that the data from the memory cells 111 were written with the bits inverted and correction of an error therein also in the second embodiment.

Third Embodiment

The third embodiment is applied with the first and second embodiments, and relates to reads of data as described above.

Figure 8:
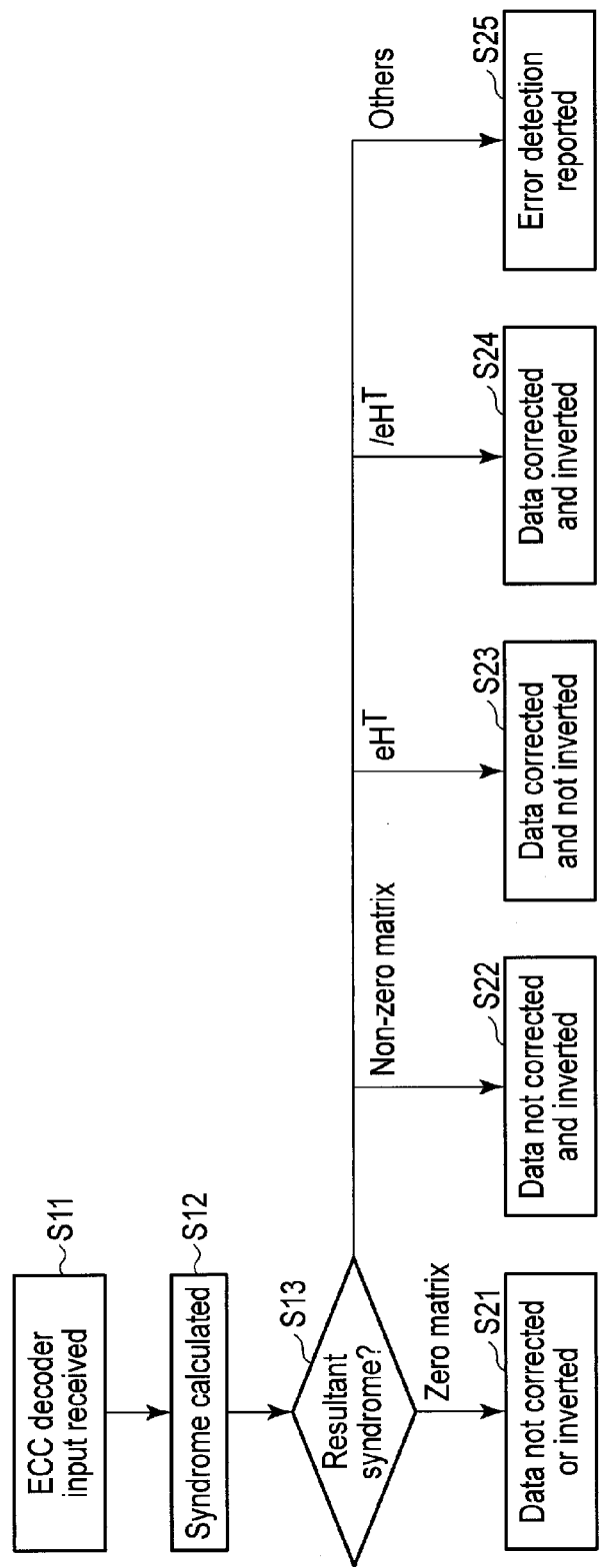
FIG. 8 illustrates the flow according to the third embodiment.

FIG. 8 illustrates the flow according to the third embodiment, and in particular illustrates the flow of operation by the ECC decoder 144. In step S11, the ECC decoder 144 receives an ECC decoder input as illustrated in FIG. 8. In step S12, the ECC decoder 144 multiplies the ECC decoder input by the check-matrix $H^T$ to calculate a syndrome. The ECC decoder 144 determines the type of the resultant syndrome (step S13). The flow shifts to one of steps S21, S22, S23, S24, and 25 as the result of the determination.

When the syndrome is a zero matrix (case of formula (1) of FIG. 4), the flow shifts to step S21. When the syndrome is a zero matrix, the read data in the ECC decoder input includes no error and is not bit-inverted. Therefore, in step S21, the ECC decoder 144 supplies the read data in the ECC decoder input to the bit inverter 145 as it is, i.e., without error correction. The ECC decoder 144 further notifies the bit inverter 145 that the read data in the ECC decoder is not bit-inverted. In accordance with this report, the bit inverter 145 outputs the read data.

When the syndrome is a non-zero matrix (case of formula (2) of FIG. 4), the flow shifts to step S22. When the syndrome is a non-zero matrix, the read data in the ECC decoder input includes no error and is bit-inverted. In other words, the ECC decoder input includes the inverted read data. Therefore, in step S22, the ECC decoder 144 supplies the inverted read data in the ECC decoder input to the bit inverter 145 as it is. The ECC decoder 144 further notifies the bit inverter 145 that the ECC decoder includes the inverted read data. In accordance with this report, the bit inverter 145 inverts (i.e., undoes) all the bits of the inverted read data to restore and output read data.

When the syndrome is $eH^T$ (case of formula (3) of FIG. 4), the flow shifts to step S23. When the syndrome is $eH^T$, the read data in the ECC decoder input includes an error and is not bit-inverted. Therefore, in step S23, the ECC decoder 144 uses the parity bits to correct the error in the read data, and supplies read data with the error corrected (error-corrected read data) to the bit inverter 145. The ECC decoder 144 further notifies the bit inverter 145 that the read data in the ECC decoder input is not bit-inverted. In accordance with this report, the bit inverter 145 outputs the error-corrected read data as the read data.

When the syndrome is $/eH^T$ (case of formula (4) of FIG. 4), the flow shifts to step S24. When the syndrome is $/eH^T$, the read data in the ECC decoder input includes an error and is bit-inverted. In other words, the ECC decoder input includes inverted read data. Therefore, in step S24, the ECC decoder 144 uses the parity bits to correct the error in the inverted read data to supply inverted read data with the error corrected (error-corrected inverted read data) to the bit inverter 145. The ECC decoder 144 further notifies the bit inverter 145 that the ECC decoder input includes the inverted read data. In accordance with this report, the bit inverter 145 inverts (i.e., undoes) all the bits of the error-corrected inverted read data to recover and output the read data.

The error-corrected and bit-inverted read data which is output in steps S21, S22, S23, and S24 is supplied to outside the memory device 1 through the input/output circuit 15.

When the determination in step S13 indicates that the syndrome is not any of a non-zero matrix, a zero matrix, $eH^T$, and $/eH^T$, the flow shifts to step S25. This case corresponds to, for example, when errors in the ECC decoder input beyond the error correction ability of the ECC decoder 144. For example, for a case of the error correction ability of the ECC decoder 144 being one bit, the shift to step S25 occurs when the (inverted) read data includes a two-bit error. The ECC decoder 144 cannot correct errors beyond its ability but can detect errors. The ECC decoder 144 outputs a report that the (inverted) read data includes uncorrectable errors to outside the memory device 1.

As described, in the third embodiment, the ECC decoder input which originates in the data written in accordance with the first or second embodiment is supplied to the ECC decoder 144, which uses the check-matrix $H^T$ to use error correction and/or bit inversion of the ECC decoder input to restore the read data. Therefore, it is possible to restore the read data possibly bit-inverted in accordance with the first or the second embodiment also with the error-correction to extract the read data.

Fourth Embodiment

The fourth embodiment relates to an example of the ECC and inversion circuit 14.

FIG. 9 is a circuit diagram illustrating an example of ECC and inversion circuit 14, in particular an example of the ECC decoder 144 and the bit inverter 145, of the fourth embodiment. Note that in the FIG. 9 example, the ECC decoder 144 and the bit inverter 145 are not separate functional blocks, but integrated. Signals Data<0> to Data<n> correspond to the most significant zeroth bit to the least significant n-th bit of the (non-inverted or inverted) read data in an ECC decoder input, respectively. The signal Sy<0:x> represents signals Sy<0> to Sy<x>, and illustrates values in the check matrix. More specifically, the signals Sy<0> to Sy<x> correspond to the first to x-th rows of the check matrix, respectively.

The ECC and inversion circuit 14 includes ECC and inversion units 1420_0 to 1420_n. The ECC and inversion units 1420_0 to 1420_n have the same logical gates and connections. Specifically, the ECC and inversion unit 1420 includes m+1 NAND gates NA1_0 to NA1_m, m+1 NOR gates NO1_0 to NO1_m, a NOR gate NO2, two NAND gates NA2 and NA3, an inverter I and two XOR gates X1 and X2. However, different ECC and inversion units 1420_0 to 1420_n receive different inputs in some logical gates as will be described later. The numbers of the NAND gates NA1 and the NOR gates NO1 are determined to satisfy particular conditions, which will be described later.

FIG. 9 also illustrates an ECC and inversion unit 1420_p (0≤p≤n) as a representative of the ECC and inversion units 1420_0 to 1420_n. The inputs of the NAND gates NA1_0 to NA1_m each receive either of the signals Sy<0> to Sy<x> and the inversion of the signals Sy<0> to Sy<x>. Similarly, the inputs of the NOR gates NO1_0 to NO1_m each receive either of the signals Sy<0> to Sy<x> and the inversion of the signals Sy<0> to Sy<x>.

Thus, the number of NAND gates NA1 and the NOR gates and the number of their inputs are determined so that each ECC and inversion unit 1420 receives either of the signals Sy<0> to Sy<x> and the inversion of the signals Sy<0> to Sy<x>. FIG. 9 illustrates the example where each NAND gate NA1 and each NOR gate NO1 have three inputs. Each NAND gate NA1 and each NOR gate NO1, however, may have two or four or more inputs, and NAND gates NA1 and the NOR gates NO1 of the number according to the number of the inputs of the NOR gate NO1 and the NAND gates NA1 may be provided.

All outputs of all the NAND gates NA1 are received by the NOR gate NO2. The output of the NOR gate NO2 is received by the inverter I. The output of the inverter I is received by the NAND gate NA3. All outputs of all the NOR gates NO1 are received by the NAND gate NA2. The output of the NAND gate NA2 is received by the NAND gate NA3. The output of the NAND gate NA3 is received by the XOR gate X1. The XOR gate X1 further receives a signal Data<p>.

The output of the XOR gate X1 is received by the XOR gate X2. The XOR gate X2 receives the signal DATA<p>. The output of the XOR gate X2 functions as an error-corrected and bit-inverted one of the bits of read data. Specifically, the error-corrected and bit-inverted read data includes values Data_ECC<0> to Data_ECC<n> in the most significant zeroth bit to the least significant n-th bit, respectively, and the XOR gate X2 of the ECC and inversion unit 1420_p outputs a value Data_ECC<p>.

As described above, according to the fourth embodiment, the ECC decoder 144 and the bit inverter 145 in the first to third embodiment can be implemented.

Fifth Embodiment

The fifth embodiment is based on the first to fourth, in particular first and second, embodiments, and relates to selection of a write mode.

As described in the first embodiment, whether the write data (the write data in ECC encoder outputs in the first embodiment) should be bit-inverted or not can be based on various criteria. The bits of the write data are inverted or maintained in accordance with the currently-set criterion. Therefore, two write modes can be defined including a mode to obtain 1-rich write data from 0-rich write data, and a mode to obtain 0-rich write data from 1-rich write data. The mode to cause the memory device 1 to store the 0-rich write data is hereinafter referred to as a 0-rich write mode, and the mode to cause the memory device 1 to store the 1-rich write data is referred to as a 1-rich write mode.

The write mode of the memory device 1 is preset, for example, and is static. Alternatively, the write mode can be set by default and dynamically set. For example, a user of the memory device 1 selects a write mode through the memory controller 2. The memory controller 2 transmits a command to the memory device 1 to set the memory device 1 to the write mode selected by the user. Specifically, when the 0- (or 1-) rich write mode is selected, the memory controller 2 supplies a command which instructs the memory device 1 to shift to the 0- (or 1-) rich write mode.

Upon reception of the command, the memory device 1 sets the ECC and inversion circuit 14 as the 0- (or 1-) rich write mode. Specifically, the controller 16 stores the value which indicates the current write mode in the registers 18 in the memory device 1. For a case of the ECC and inversion circuit 14 in the memory controller 2 as in the first embodiment, the registers 18 are provided in the memory controller 2.

The ECC and inversion circuit 14 operates in the write mode indicated by the registers 18. Specifically, it converts the 0- (or 1-) rich write data into the 1- (or 0-) rich write data in accordance with the set mode.

As described, the memory device 1 of the fifth embodiment can have the write mode set dynamically from outside. Therefore, a user can select a write mode in accordance with the example considerations described in the first embodiment in accordance with the usage of the memory device 1 or the priorities of various factors.

Sixth Embodiment

Arrangement

FIG. 10 illustrates functional blocks of a memory controller 300 of the sixth embodiment. The memory controller 300 controls a memory device 200 of FIG. 11. FIG. 11 illustrates functional blocks of the memory device 200 of the sixth embodiment. The memory device of FIG. 11 will be described prior to the description for the memory controller 300.

The memory devices 200 is a dynamic RAM (DRAM), a magnetoresistive RAM (MRAM), a resistive RAM (ReRAM), or a phase change RAM (PCRAM), for example. The sixth embodiment is not limited by the data storage scheme of the memory device 200. The memory device 200 includes an address buffer 201, a command buffer 202, a memory core controller 203, an I/O buffer 204, an I/O controller 205, registers 206, and a memory cell array 207.

The address buffer 201 temporarily stores an address Mem_add from the memory controller 300, and supplies the same to the memory core controller 203. The command buffer 202 temporarily stores a command Mem_cmd from the memory controller 300, and supplies the same to the memory core controller 203. The I/O buffer 204 strobes write data transmitted from the memory controller 300 through data Mem_DQ with a signal Mem_DQS, and supplies the same to the I/O controller 205. The I/O buffer 204 further transmits read data from the I/O controller 205 through the data Mem_DQ, and transmits a signal Mem_DQS for strobe to the memory controller 300. The I/O buffer 204 supplies the write data to the I/O controller 205, and receives the read data from the I/O controller 205 by control of the memory core controller 203. In accordance with the control of the memory core controller 203, the I/O controller 205 supplies the write data to the memory cell array 207, and receives the read data from the memory cell array 207. In accordance with the address and control signal from the address buffer 201 and command buffer 202, the memory core controller 203 writes data in and reads data from the memory cell array 207. The memory cell array 207 includes components, such as memory cells 111 and various signal lines 112. The registers 206 store various information.

Referring back to FIG. 10, the memory controller 300 includes an address FIFO 301, a command FIFO 302, a memory access controller 303, and a write data FIFO 304 and a read data FIFO 305. The address FIFO 301 temporarily stores an address Sys_add from the host device 400, and supplies the same to the memory access controller 303. The command buffer FIFO 302 temporarily stores a command Sys_cmd from the host device 400, and supplies the same to the memory access controller 303. The write data FIFO 304 temporarily stores write data Sys_DQIN from the host device 400, and outputs write data WDin in accordance with the data Sys_DQIN. The read-data FIFO 305 temporarily stores read data RDout, and outputs read data Sys_DQOUT in accordance with the Data RDout.

The memory access controller 303 generates an address Mem_add and a command Mem_cmd for executing a data write to or a data read from address Sys_add in accordance with the command Sys_cmd. The memory access controller 303 receives the data Mem_DQ and Mem_DQS from the memory device 200, and outputs read data MRDin in accordance with the data Mem_DQ and Mem_DQS. The memory access controller 303 receives write data MWDout, and generates data Mem_DQ and Mem_DQS which will be written in the memory device 200 from the write data MWDout.

The memory controller 300 further includes an ECC controller 311, error bit registers (EBREG) 312, a bit count and inversion control unit 313, data inversion registers (DINREG) 314, data polarity flags (DINFLG) 315, a temperature sensor 321, a timer 322, a write verification controller 323, write verification registers (WVREG) 324, write verification flags (WVFLG) 325, a refresh controller 326, refresh registers (REFREG) 327 and refresh flags (REFLG) 328.

The ECC controller 311 receives the write data WDin, and outputs write data WDout in accordance with the write data WDin. The ECC controller 311 generates parity WEout from the write data WDin in accordance with predefined rules for generating error correction codes. The parity WEout is generated for each error correction unit, which has a predetermined size, of the write data WDin. The ECC controller 311 receives read data RDin and parity REin, uses the parity REin to correct an error of the corresponding read data RDin, and outputs error-corrected read data RDout. The ECC controller 311 can correct a predetermined number (for example, one bit) of errors in input data (for example, a part of read data RDin) of a size equal to an error correction unit. When errors in read data RDin are corrected, the error bit registers 312 store a predetermined-sized address range which includes the address of the memory cells 111 which stored that read data RDin.

The error bit registers 312 store N address ranges (error bit address ranges) in the form illustrated, for example, in FIG. 12. An error bit address range indicates a range of the address including a memory cell 111 which stored an error bit and has any size, and may include the address of a single memory cell 111, the address of a particular number of memory cells 111 (page), or the address of multiple pages, for example. A single error bit address range is represented by, for example, thirty-two bits in an error bit register 312 as illustrated in FIG. 12. A particular value EBREG_N [31:0] in the error bit registers 312 indicates the start and end addresses of a error bit address range in values EBREG_N [0:15] and ERBREG_N [31:16], respectively, where N is an ID for distinguishing multiple EBREGs from each other.

The data inversion registers 314 store N address ranges (bit inversion address ranges). The data polarity flags 315 store flags (data polarity flags) which indicate data polarities for respective bit inversion address ranges. A bit inversion address range is defined as write data into the memory cells 111 of that range may be bit-inverted to have majority bits of the polarity indicated by the data polarity flag.

The data inversion registers 314 store bit inversion address ranges in the form illustrated, for example, in FIG. 13. A bit inversion address range has any size, and may include the address of a single memory cell 111, the address of a particular number of memory cells 111 (page), or the address of multiple pages, for example. A single bit inversion address range is represented by, for example, thirty-two bits in a data inversion register 314 as illustrated in FIG. 13. A particular value DINREG_N [31:0] in data inversion registers 314 indicates the start and end addresses of a bit inversion address range in values DINREG_N [0:15] and DINREG_N [31:16], respectively.

The data polarity flags 315 store N data polarity flags in the form illustrated, for example, in FIG. 14. A data polarity flag is represented by, for example, one bit as illustrated in FIG. 14. The value DINFLG_N indicates that data to be written in the memory cells 111 of the corresponding bit inversion address range should be 0-rich or 1-rich when it is 0 or 1, respectively.

The bit count and inversion control unit 313 counts the logical 0 bits (or logical 1 bits) in the write data WDout, the parity WEout, and the read data MRDin. The bit count and inversion control unit 313 further outputs write data MWDout. The write data MWDout includes a set of write data WDout and the corresponding parity WEout, or a set of inverted write data WDout and the corresponding inverted parity WEout. When the address of the memory cells 111 into which write data WDout and parity WEout will be written is included in a particular bit inversion address range, the bit count and inversion control unit 313 maintains or inverts all bits of the write data WDout and the parity WEout to obtain write data MWDout in accordance with the value of the corresponding data polarity flag 315.

The bit count and inversion control unit 313 further receives the read data MRDin. The read data MRDin includes a set of read data RDin and the corresponding n parity REin, or a set of inverted read data RDin and the corresponding inverted parity REin. When the address of the memory cells 111 from which the read data MRDin was read is included in a particular bit inversion address range, the bit count and inversion control unit 313 maintains or inverts all bits of the read data MRDin to obtain read data RDin and parity REin in accordance with the value of the corresponding data polarity flag 315.

The bit count and inversion control unit 313 executes bit count and bit inversion in units of predetermined sizes.

The temperature sensor 321 measures the temperature inside the memory controller 300, outputs thermal data TEout based on the measured temperature, and outputs thermal data TEout in the form illustrated, for example, in FIG. 15. The thermal data represents a range to which the measured temperature belongs as illustrated in FIG. 15. For example, the temperature sensor 321 outputs 00, 01, 10 and 11 as thermal data TEout when the temperature is less than 25° C., larger than or equal to 25° C. and less than 50° C., larger than or equal to 50° C. and less than 75° C., and larger than or equal to 75° C., respectively. The TEout is output periodically, for example. The timer 322 outputs a signal TIout (i.e., a pulse of "H" level) at every predetermined time.

The write verification registers 324 store N address ranges (write verification address ranges). When data is written in the memory cells 111 of a write verification address range, write verification is executed to the written data. The write verification flags 325 store indications of execution or non-execution of write verification for respective write verification address ranges.

The write verification registers 324 store write verification address ranges in the form illustrated, for example, in FIG. 16. A write verification address range indicates an address range that includes the memory cells 111 to which the write verification may be executed and has any size, and it may include the address of a single memory cell 111, the address of a particular number of memory cells 111 (page), or the address of multiple pages, for example. A single write verification address range is represented by, for example, thirty-two bits in a write verification register 324 as illustrated in FIG. 16. A particular value WVREG_N [31:0] in write verification registers 324 indicates the start and end addresses of a write verification address range in values WVREG_N [0:15] and WVREG_N [31:16], respectively.

When data is written in the memory cells 111 of a write verification address range, the write verification controller 323 executes or does not execute write verification to the written data. Specifically, the write verification controller 323 interprets the command and the address from the command FIFO 302 and address FIFO 301, and refers to the write verification register 324 to recognize an instruction of data write to the memory cells 111 of a write verification address range. The write verification controller 323 further refers to the corresponding write verification flag 325 and the thermal data TEout to determine execution or non-execution of write verification. FIG. 17 illustrates examples of the relationship between the combination of the write verification flag 325 and the thermal data TEout, and execution or non-execution of the write verification.

As illustrated in FIG. 17, the write verification controller 323 does not execute the write verification when the write verification flag 325 is 0. In contrast, the write verification controller 323 executes the write verification regardless of the thermal data TEout when the write verification flag 325 is 1 (Function 2). In the example of Function 1, the write verification controller 323 executes the write verification when the write verification flag 325 is 1 and the temperature is low, i.e., the thermal data TEout indicates, for example, 00. The write verification controller 323 does not execute the write verification when the temperature is not low, i.e., the thermal data TEout indicates values other than, for example, 00, even if the write verification flag 325 is 1.

The write verification involves the following steps. The write verification controller 323 reads written data and determines whether the read data matches the data to be written (write data) MEM_DQ and MEM_DQS through control of the memory access controller 303. When they match, the write verification controller 323 determines that the write was successful. In contrast, if they do not match, the write verification controller 323 writes the write data again, and executes the write verification again. Write verification is repeated until it is determined that the write is successful within a range below a predetermined maximum cycle count, and ends when the write is still unsuccessful after the maximum cycle count of rewrites.

The refresh registers 327 store N address ranges (refresh address ranges). The refresh flags 328 store indications of execution or non-execution of refresh for respective refresh address ranges.

The refresh registers 327 store the refresh address ranges in the form illustrated, for example, in FIG. 18. A refresh address range indicates an address range that includes the memory cells 111 to which the refresh may be executed and has any size, and it may include the address of a single memory cell 111, the address of a particular number of memory cells 111 (page), or the address of multiple pages, for example. A single refresh address range is represented by, for example, thirty-two bits in a refresh register 327 as illustrated in FIG. 18. A particular value REFREG_N [31:0] in refresh registers 327 indicates the start and end addresses of a refresh address range in values REFREG_N [0:15] and WVREG_N [31:16], respectively.

The refresh controller 326 executes or does not execute the refresh to the memory cells 111 of the refresh address ranges. Specifically, the refresh controller 326 refers to the corresponding refresh flag 328 and the thermal data TEout to determine execution or non-execution of the refresh. FIG. 19 illustrates examples of the relationship between the combination of the refresh flag 328 and the thermal data TEout, and execution or non-execution of refresh. As illustrated in FIG. 19, the refresh controller 326 executes the refresh when the refresh flag 328 is 0. In the example of Function 2, the refresh controller 326 does not execute the refresh when the temperature is low or normal, i.e., when the thermal data TEout indicates, for example, 00 or 01, even if the refresh flag 328 is 1. In the example of Function 2, the refresh controller 326 executes the refresh for every cycle TIout when the refresh flag 328 is 1 and the temperature is high, i.e., the thermal data indicates, for example, 10 or 11.

In the example of Function 1, the refresh controller does not execute the refresh even when the temperature is low, i.e., the thermal data TEout indicates, for example, 00, even if the refresh flag 328 is 1. In the example of Function 1, the refresh controller 326 executes the refresh when the refresh flag 328 is 1 and the temperature is not low, i.e., the thermal data TEout indicates, for example, 01, 10, or 11. In the example of Function 1, the refresh controller 326 executes the refresh with different cycles in accordance with the thermal data. When the thermal data TEout indicates, for example, 01, 10, and 11, the refresh controller 326 executes the refresh with the cycles of time TIout, TIout/2, and TIout/4, respectively. The refresh controller 326 may execute the refresh when the refresh flag 328 is 1 regardless of the value of the thermal data.

The refresh involves a read of stored data from the memory device 200, and a re-write of the read data. Any of the registers 312, 314, 324 and 327 and the flags 315, 325 and 328 may be volatile or nonvolatile. Values for volatile registers and flags are stored in nonvolatile storage and are read to corresponding volatile registers and flags upon the boot of the memory controller 300. Any register and flag may or may not be configurable after the memory controller 300 is shipped. The registers and flags may be held in the registers 206 of the memory device 200, or in the specific area of the memory cells 111 of the memory device 200.

Operation

Operations of the memory controller 300 in various stages will now be described. FIG. 20 illustrates some stages where the memory controller 300 of the sixth embodiment operates and the operations at corresponding stages. The operations to be described include setting up of the registers 312, 314, 324 and 327 and the flags 315, 325 and 328. As illustrated in FIG. 20, the four steps S100, S200, S300 and S400 are assumed. The following description is based on the memory device 200 being an example memory of a type in which the read disturb may occur, i.e., read operation may cause unexpected data flip, and the read current Ir and the 1 write current IwAP flow in the same direction. The details of each step will be described later.

Step S100 involves a test of the memory device 200 which is controlled by the memory controller 300, before being shipped and/or booted for the first time. In accordance with the results of the test, appropriate values are then set to the registers and flags. For example, a write test is executed to the memory device 200 to recognize areas in which it is easy or hard write 0 data, and areas in which it is easy or hard to write 1 data. Moreover, areas susceptible or robust to the read disturb, i.e., areas in which the 0 data easily switches or switches with difficulty to 1 data, are recognized.

Step S200 involves setting up one or more of the registers 312, 314, 324 and 327 and the flags 315, 325 and 328 upon a write and/or an update of a program in the memory device 200. For example, areas where a program will be stored are set to store 0-rich data to be more robust to the read disturb. Alternatively, step S200 involves setting up the registers and flags by the user based on the usage of the memory device 200. For example, areas where data will be frequently written may be set to store 0-rich data to improve endurance.

Step S300 involves setting up one or more of the registers 312, 314, 324 and 327 and the flags 315, 325 and 328 by the user's intention and/or based on detected error bits during the use of the memory device 200 and the memory controller 300 after the shipment. For example, address ranges including memory cells 111 including an error detected through, for example, the ECCs may be set to store 1-rich data to be more robust to the read disturb.

Step S400 involves execution of a program for periodical maintenance for the memory device 200 and memory controller 300 after being shipped, and setting up of one or more values of the registers 312, 314, 324 and 327 and the flags 315, 325 and 328. Specifically, steps S100, S200, and S300 are executed during the maintenance, and the registers and flags are updated to better match the current state of the memory device 200.

Steps S100, S200, S300 and S400 will now be described in more detail. First, referring to FIGS. 21 to 25, step S100 will described in detail.

FIG. 21 is the flowchart of part of the sixth embodiment, and illustrates step S100 of FIG. 20 in detail. In step S150, the memory device 200 is tested for the characteristics. The characteristic test is controlled by a tester, and executed by the memory controller 300 in accordance with instructions of the tester to the memory device 200 which is controlled by the memory controller 300. In step S151, based on the results of the characteristic test, values are set in one or more of the registers 312, 314, 324 and 327 and the flags 315, 325 and 328. Steps S150 and S151 will now be described in more detail.

FIG. 22 is the flowchart of a write test of the sixth embodiment, and illustrates part of step S150 of FIG. 21. First, the memory controller 300 writes 0 data in all the memory cells 111 to be tested in step S101. All the memory cells do not necessarily have 0 data, and data input pattern can be arbitrary.

In step S102, the memory controller 300 writes 1 data in the memory cells 111 of a to-be-tested address, and reads the written data. The read data is received by the tester, which determines whether the received data includes an error from the written data in step S103. If there is an error (No branch of step S103), the tester stores the address under test in step S104. This address may be treated as an address of the memory cells 111 in which it is difficult to write 1 data. The address may be stored in the memory device 200.

With no error (Yes branch of step S103) or after completion of step S104, the tester changes the address under test in step S105. The change of the address can be performed in any manner, and, for example, executed through incrementing the address. Steps S102 to S105 are repeated to all the addresses to be tested. Specifically, the tester determines whether steps S102 to S105 have been executed to all the to-be-tested addresses in step S106. With an untested address (No branch of step S106), the flow returns to step S102; otherwise (Yes branch of step S106), it shifts to step S107.

In step S107, the tester changes the parameters. The parameters include a time or voltages for a 1-data write in the memory device 200, and the temperature of the memory device 200, etc., for example. Steps S102 to S107 are repeated for all the parameter values. Specifically, the tester determines whether all the values of all the parameters have been used for the test in step S108. After all the parameter values are used (Yes branch of step S108), the flow ends; otherwise (No branch of step S108), it returns to step S102.

FIG. 23 is the flowchart of another write test of the sixth embodiment, and illustrates part of step S150 of FIG. 21. The flow of FIG. 23 is the same as that of FIG. 22 except for data to be written. First, the memory controller 300 writes 1 data in all the memory cells 111 to be tested in step S111. All the memory cells do not necessarily have 1 data, and data input pattern can be arbitrary. In step S112, the memory controller 300 writes 0 data in the memory cells 111 of a to-be-tested address, and reads the written data. The read data is received by the tester, which determines whether the received data includes an error from the written data in step S113. If there is an error (No branch of step S113), the tester stores the address under test in step S114. This address may be handled as an address of the memory cells 111 in which it is hard to write 0 data. The address may be stored in the memory device 200. With no error (Yes branch of step S113), the flow shifts to step S115. Steps S114 to S118 are the same as steps S104 to S108, respectively.

FIG. 24 is the flowchart of a read test of the sixth embodiment, and illustrates part of step S150 of FIG. 21. First, the memory controller 300 writes 0 data in all the memory cells 111 to be tested in step S121. All or some of the to-be-tested memory cells 101 may be written with 1 data instead of 0 data. In step S122, the memory controller 300 reads data from the memory cells 111 of one or more to-be-tested addresses. The read data is received by the tester, which determines whether the received data includes an error from the written data in step S123. The read can cause the read disturb in the memory cells 111 storing 0 data. When the stored data is inverted due to the read disturb, the read data is 1 data and the received data includes an error. This (No branch of step S123) makes the flow proceed to step S124, and the tester stores the address under test in step S124. This address may be treated as an address of the memory cells 111 susceptible to the read disturb. The address may be stored in the memory device 200.

With no error (Yes branch of step S123) or after completion of step S124, the flow shifts to step S125. Step S125 is the same as step S105, where the address to be tested is changed. Steps S122 to S125 are repeated to all the addresses to be tested. Specifically, the tester determines whether steps S122 to S125 have been executed to all the addresses in step S126. With an untested address (No branch of step S126), the flow returns to step S122; otherwise (Yes branch of step S126), it shifts to step S127.

In step S127, the tester changes the parameters. The parameters include a time or voltages for a read in the memory device 200, and the temperature of the memory device 200, etc., for example. Steps S122 to S127 are repeated for all the values of all the parameters. Specifically, the tester determines whether all the values of all the parameters have been used for the test in step S128. After all the parameter values are used (Yes branch of step S128), the flow ends; otherwise (No branch of step S128), it returns to step S122.

FIG. 25 is the flowchart of a retention test of the sixth embodiment, and illustrates part of step S150 of FIG. 21. First, the memory controller 300 writes 0 data in all the memory cells 111 to be tested in step S131. All or some of the to-be-tested memory cells 101 may be written with 1 data instead of 0 data. In step S132, after a lapse of a predetermined time, the memory controller 300 reads data from the memory cells 111 of a to-be-tested address. The read data is received by the tester, which determines whether the received data includes an error from the written data in step S133. When the received data include an error (No branch of step S133), the tester stores the address under test in step S134. This address may be treated as an address of the memory cell 111 with a bad retention characteristic. The address may be stored in the memory device 200.

With no error (Yes branch of step S133) or after completion of step S134, the flow shifts to step S135. Step S135 is the same as step S105, where the address to be tested is changed. Steps S132 to S135 are repeated to all the addresses to be tested. Specifically, the tester determines whether steps S132 to S135 have been executed to all the addresses in step S136. With an untested address (No branch of step S136), the flow returns to step S132; otherwise (Yes branch of step S136), it shifts to step S137.

In step S137, the tester changes the parameters. The parameters include the interval in step S132, and the temperature of the memory device 200, etc., for example. Steps S132 to S137 are repeated for all the values of all the parameters. Specifically, the tester determines whether all the values of all the parameters have been used for the test in step S138. After all the parameter values are used (Yes branch of step S138), the flow ends; otherwise (No branch of step S138), it returns to step S132.

After the test flows of FIGS. 22 to 25 are executed in step S150 of FIG. 21, based on the results of the test, the tester registers values in one or more of the registers 312, 314, 324 and 327 and the flags 315, 325 and 328 of the memory controller 300 in step S151. As described above, for a case of the registers and flags being volatile, the registers and flags are held in the memory device 200 controlled by the memory controller 300. The examples of test results and setting up of the registers and flags will be described in the following.

For example, an address range including the address of memory cells 111 determined to be hard to be written in through the write test is registered in a write verification register 324 and the corresponding write verification flag is set to 1. Moreover, an address range of the memory cells 111 in which it is easy to write 0 or 1 data is registered in a data inversion register and the corresponding data polarity flag 315 is set to 0 or 1, respectively. Moreover, an address range including the address of memory cells 111 determined to be susceptible to the read disturb through the read test is registered in a refresh register 327 and the corresponding refresh flag 328 is set to 1. In addition or alternatively, an address range including the address of memory cells 111 determined to be susceptible to the read disturb is registered in a data inversion register 314 and the corresponding data polarity flag 315 is set to 1. Similarly, an address range including the address of the memory cells 111 determined to have a bad retention characteristic through the retention test is registered in a refresh register 327 and the corresponding refresh register 327 is set to 1. In addition or alternatively, an address range including the address of the memory cells 111 with a bad retention characteristic for 0 data or 1 data is registered in a data inversion register 314 and the corresponding data polarity flag 315 is set to indicate 1-rich or 0-rich, respectively. The registers and flags can be set in accordance with any other conditions. Furthermore, the address of memory cells 111 determined to have bad write, read, and/or retention characteristics may be registered in an error bit register 312.

Referring to FIG. 26, step S200 will now be described in more detail. In step S200, one or more of the registers 312, 314, 324 and 327 and the flags 315, 325 and 328 of the memory controller 300 are set, based on the usage of the memory device 200 controlled by the memory controller 300. FIG. 26 illustrates an example of usage of the memory space of the memory device controlled by the memory controller of the sixth embodiment, and the values of the registers and flags of the memory controller.

It is decided or expected that the memory device 200 uses the memory area of addresses 0000h to XXXXh to store the data for boot and an operating system (OS). Moreover, it is decided or expected that the memory device 200 uses the memory area of addresses YYYYh to ZZZZh to store program 1. These areas are desired to be robust to the read disturb, and therefore are set as areas in which 1-rich data is written and to which the refresh is executed. Specifically, the set is executed as REFREG_0[31:16]=XXXXh, REFREG_0 [0:15]=0000h, REFLG_0=1b, DINREG_0[31:16]= XXXXh, DINREG_0[0:15]=0000h, and DPFLG_0=1b. Similarly, the set is executed as REFREG_1[31:16]= ZZZZh, REFREG_1 [0:15]=YYYYh, REFLG_1=1b, DINREG_1[31:16]=ZZZZh, DINREG_1[0:15]=YYYYh, and DPFLG_1=1b.

Moreover, it is decided or expected that the memory device 200 uses the memory area of addresses AAAAh to BBBBh to store parameters for program 1. Since the write operation is frequently performed in such an area, it is desired to prevent write errors, and to improve write endurance. Therefore, 0-rich data is written and the write verification is executed in such an area. Specifically, the set is executed as WVREG_0[31:16]=BBBBh, WVREG_0 [0:15]=AAAAh, WVFLG_0=1b, DINREG_2[31:16]= BBBBh, DINREG_2[0:15]=AAAAh, and DPFLG_2=0b.

Furthermore, it is decided or expected that the memory device 200 uses the memory area of addresses CCCCh to DDDDh as workspace, specifically a work memory. Therefore, the area is set as an area in which 0-rich data is written. Specifically, the set is executed as DINREG_3[31:16]= DDDDh, DINREG_3[0:15]=CCCCh, and DPFLG_3=0b.

Referring to FIGS. 27 to 33, step S300 will now be described in full detail. In step S300, the values of the registers 312, 314, 324 and 327 and the flags 315, 325 and 328 set in steps S100 and S200 can be updated by the user. To this end, the values of the registers and flags can be read to outside the memory controller 300, for example. Moreover, in accordance with the usage of the memory device 200, areas for a particular use in the memory device 200, such as a program space or workspace, are assigned. In accordance with this usage, the values of the registers and flags of the memory controller 300 are appropriately set.

Step S300 also includes one, some or all of the flows of FIGS. 27 to 33. The memory controller 300 is configured to execute the flow of FIGS. 27 to 33. FIG. 27 illustrates the flow of a write of the sixth embodiment. When the memory controller 300 receives a write command, an address of memory cells 111 targeted for the write (write address) and write data Sys_DQIN, a write begins. Then, write data WDin is transferred to the ECC controller 311. The ECC controller 311 generates parity WEout from the write data WDin, and supplies the parity WEout to the bit count and inversion control unit 313 in step S311. The ECC controller 311 also supplies the write data WDin to the bit count and inversion control unit 313 as the write data WDout.

In step S312, the bit count and inversion control unit 313 determines whether the write address is included in the bit inversion address range of either of the data inversion registers 314. With the write address not registered (No branch of step S312), the bit count and inversion control unit 313 supplies write data MWDout generated from the write data WDout and the parity WEout to the memory access controller 303 in step S313. The memory access controller 303 instructs the memory device 200 to write data Mem_Dq and Mem_DQS in the memory cells 111 of the write address in accordance with the received data MWDout.

With the write address registered (Yes branch of step S312), the bit count and inversion control unit 313 maintains or inverts all the bits of the write data WDout and the parity WEout to generate write data MWDout in step S314. The write data MWDout includes the set of non-inverted or inverted write data WDout and parity WEout. The flow then shifts to step S313.

FIG. 28 illustrates the flow of data inversion of the sixth embodiment, and illustrates the flow executable as step S314 of FIG. 27. In step S321, the bit count and inversion control unit 313 counts 0 bits in the received data. In step S322, the bit count inversion control unit 313 determines whether the count of 0 bits is larger than the count of 1 bits. With more 0 bits (Yes branch of step S322), the bit count and inversion control unit 313 determines whether the data polarity flag 315 corresponding to the address range is 0 in step S323. For a case of the FIG. 28 flow executed as part of a write, the bit-inversion-target data is write data WDout and parity WEout, and the associated address is the write address.

With the data polarity flag being 0 (Yes branch of step S323), the bit count and inversion control unit 313 outputs the bit-inversion-target data as it is in step S324. For a case of the FIG. 28 flow executed as part of a write, the bit count and inversion control unit 313 outputs the write data WDout and parity WEout as write data MWDout.

With the data polarity flag being 1 (No branch of step S323), the bit count and inversion control unit 313 inverts all the bits of the bit-inversion-target data to output the inverted data in step S328. For a case of the FIG. 28 flow executed as part of a write, the bit count and inversion control unit 313 outputs inverted write data WEout and inverted parity WEout as the write data MWDout.

With a 0 bit count not being larger in step S322 (No branch of step S322), the bit count and inversion control unit 313 determines whether the count of 1 bits is larger than that of 0 bits in step S326. With more 1 bits (No branch of step S326), the flow shifts to step S324; otherwise (Yes branch of step S326), it shifts to step S327. Step S327 is the same as step S323. In step S327, the bit count and inversion control unit 313 determines whether the data polarity flag 315 corresponding to the address range associated with the bit-inversion-target data is 0. With the data polarity flag being 0 (Yes branch of step S327), the flow shifts to step S328; otherwise (No branch of step S327), it shifts to step S324.

Patterns of the bit inversion by the bit count and inversion control unit 313 can be summarized as follows. When there are more 0 bits of an input, which is the write data WEout and parity WEout for a write case, and when the value of the data polarity flag 315 is 0, the bit count and inversion control unit 313 outputs the input as it is. The output corresponds to the write data MWout for a case of a write. When 0 bits of an input are the majority and the data polarity flag 315 is 1, the bit count and inversion control unit 313 inverts all the bits of the input to output the inverted input.

When 1 bits of an input are the majority and the data polarity flag 315 is 0, the bit count and inversion control unit 313 outputs the inverted input. When 1 bits of an input are the majority and the data polarity flag 315 is 1, the bit count and inversion control unit 313 outputs the input as it is. When the count of 1 bits and the count of 0 bits are equal and the data polarity flag 315 is 1, the bit count and inversion control unit 313 outputs the input as it is. FIG. 29 illustrates examples of inputs and outputs by the bit count and inversion control unit 313. FIG. 29 relates to an example case where the unit of bit counting and inversion control is sixteen bits and the data polarity flag 315 is 0. The first and second rows from the top illustrate an example of 1 bits in an input being the majority. The third row illustrates an example of 0 bits in an input being the majority. The fourth row illustrates an example of the 0 bit count and 1 bit count being equal.

FIG. 30 illustrates the flow of write verification of the sixth embodiment. The memory controller 300 executes the flow of FIG. 30, for example after completion of the FIG. 27 flow. In step S331, the write verification controller 323 determines whether the write address is included in the write verification address range of either of the write verification registers 324. When the write address is not registered (No branch of step S331), the flow ends; otherwise (Yes branch of step S331), it shifts to step S332. In step S332, the write verification controller 323 determines whether the conditions to trigger the write verification are fulfilled. Specifically, the write verification flag 325 corresponding to the write address needs to be 1. Furthermore, for a case of Function 1 (see, FIG. 17), the value of the thermal data TEout also needs to be 00. With the conditions to trigger the write verification fulfilled (Yes branch of step S332), the write verification controller 323 reads the data stored in the memory cells 111 of the write address through the memory access controller 303 in step S333. With the conditions to trigger the write verification not fulfilled (No branch of step S332), the flow ends.

In step S334, the write verification controller 323 compares the read data with the data which should have been written in the memory cells 111 of the write address. When the two data items match (Yes branch of step S334), the flow ends; otherwise (No branch of step S334), it shifts to step S335. In step S335, the write verification controller 323 writes the instructed data to the memory cells 111 of the instructed write address through the memory access controller 303. This write corresponds to the write in step S313 of FIG. 27.

In steps S337 and S338, the write verification controller 323 executes the same steps as steps S333 and S334, respectively. When the two data items match (Yes branch of step S338), the flow ends; otherwise (No branch of step S338), it shifts to step S339. In step S339, the write verification controller 323 returns error status (Sys_Status=1) to the host device 400. Alternatively, in step S339, a process for the redundancy may be executed to the memory cells 111 of the address of the write verification target. Specifically, the memory cells 111 of the address of the target of write verification may be replaced by redundant memory cells 111. Alternatively, if a bit which cannot be correctly written in can be corrected by the ECC controller 311, the write-verification-target address is registered in the error bit register 312 to complete the write verification in step S339.

FIG. 30 illustrates an example of failure of the write to result in execution of a re-write once. The re-write, however, may be executed twice or more. Specifically, the same set as the set of data comparison and a re-write (steps S333, S334, and S336) may be executed once or more between steps S338 and S339.

Figure 31:
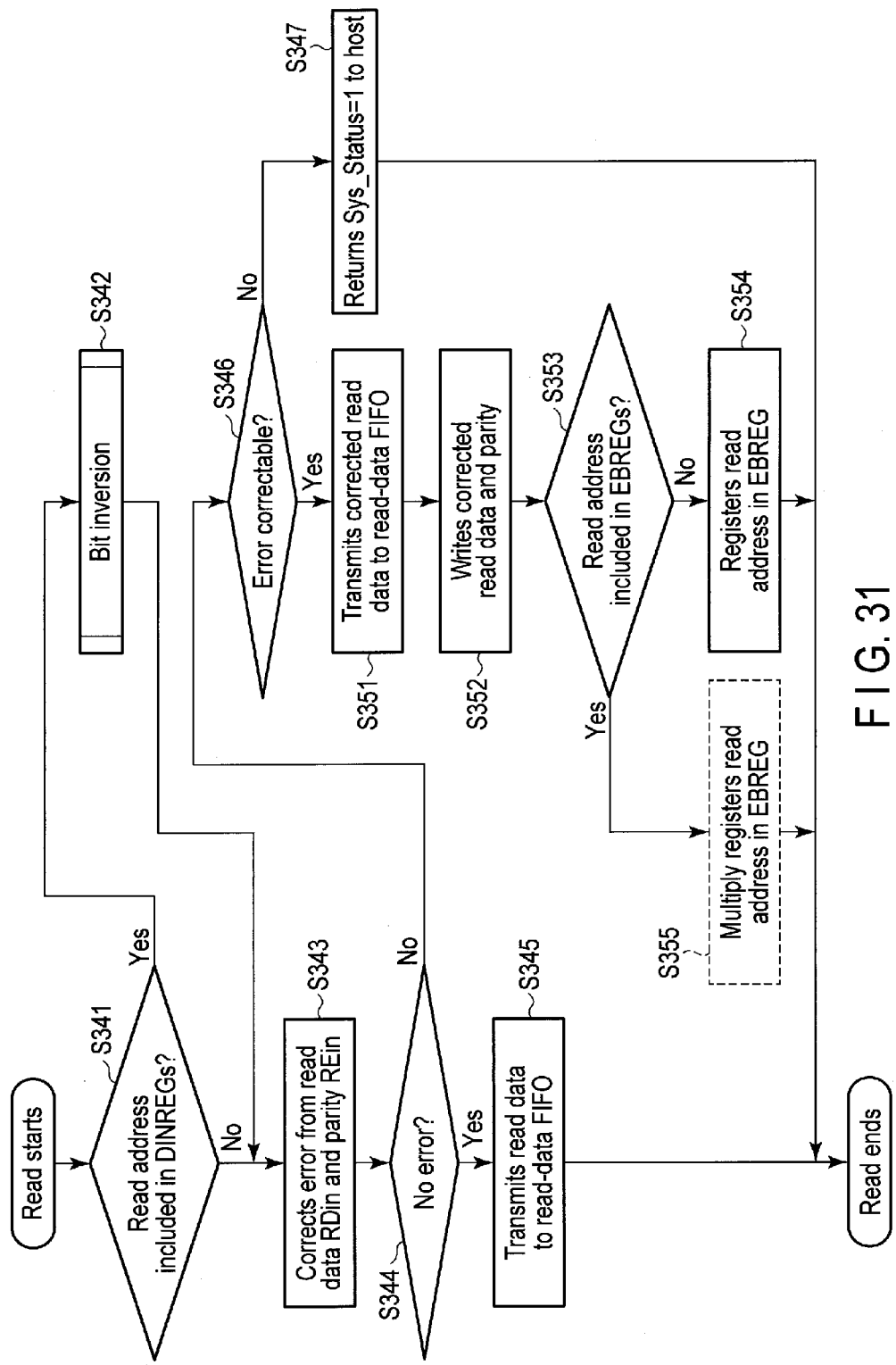
FIG. 31 illustrates the flow of a read of the sixth embodiment.

FIG. 31 illustrates the flow of a read of the sixth embodiment. When the memory controller 300 receives a read command, and address of memory cells 111 targeted for the read (read address), a read begins. With the start, the memory access controller 303 takes in data Mem_DQ from the memory cells 111 of the read address using the signal Mem_DQS, and supplies read data MRDin to the bit count and inversion control unit 313. Then, in step S341, the bit count and inversion control unit 313 determines whether the read address is included in the bit inversion address range of either of the data inversion registers 314. With the read address registered (Yes branch of step S341), the flow shifts to step S342. In step S342, the bit count and inversion control unit 313 maintains or bit-inverts the read data MRDin to output non-inverted or inverted read data RDin and parity REin. In step S342, the memory controller 300 can execute the flow of FIG. 28. In this case, the bit-inversion-target data is the read-data MRDin, and the output of the bit count and inversion control unit 313 is the read data RDin and the parity REin.

With the read address not registered (No branch of step S341) or after step S342 ends, the ECC controller 311 uses the parity REin to correct an error of the read data RDin in step S343. When an error is not detected in step S344 (Yes branch of step S344), the ECC controller 311 supplies the read data RDin to the read-data FIFO 305 as read data RDout in step S345.

When the read data RDin includes an error (No branch of step S344), the ECC controller 311 determines whether the error is correctable in step S346. With the error uncorrectable (No branch of step S346), the ECC controller 311 returns error status (Sys_Status=1) to the host device 400 in step S347. With the error correctable (Yes branch of step S346), the ECC controller 311 corrects the error, and, based on the error-corrected read data RDin, supplies read data RDout to the read-data FIFO 305 in step S351.

In step S352, the ECC controller 311 writes again the error-corrected read data RDin and parity REin in the memory device 200 through the bit count and inversion control unit 313 and the memory access controller 303. Specifically, the ECC controller 311 first supplies the bit count and inversion control unit 313 with the error-corrected write data RDin as WDout and parity WEout calculated from the error-corrected data RDin. The bit count and inversion control unit 313 generates write data MWDout from the write data WDout and parity WEout to supply the write data MWDout to the memory access controller 303. Based on the write data MWDout, the memory access controller 303 writes data Mem_DQ and Mem_DQS in the memory cells 111 of the read address.

In step S353, the ECC controller 311 determines whether the read address is included in the error bit address range of either of the error bit registers 312. With the read address not registered (No branch of step S353), the ECC controller 311 registers the read address or an address range including the read address in an error bit register 312 in step S354. With error bit address already fully registered, the error bit address range may be written in memory cells 111 of the memory device 200 or overwritten in any one of the registers or the registration may be omitted.

With the read address registered (Yes branch of step S353), the flow ends. Alternatively, in order to indicate multiple occurrences of the read data RDin including an error, the read address or an address range including the read address may be optionally multiply registered in an error bit register 312 (step S355).

FIG. 32 illustrates the flow after registration of an error bit address range to an error bit register of the sixth embodiment. After a particular address range is registered in an error bit register 312, e.g., after step S354 of FIG. 31, the memory controller 300 executes the flow of FIG. 32 for this error bit address range. In step S361, the ECC controller 311 or the refresh controller 326 determines whether the error bit address range is included in the refresh address range of either of the refresh registers 327. With the error bit address range not registered (No branch of step S361), the ECC controller 311 or the refresh controller 326 registers the error bit address range in a refresh register 327 and sets the value of the corresponding refresh flag to 1 in step S362. The flow then shifts to step S365. The flow also shifts to step S365 when the error bit address range is registered (Yes branch of step S361). Optionally, the error bit address range may be multiply registered in a refresh register 327 (step S363).

In step S365, the ECC controller 311 or the bit count and inversion control unit 313 determines whether the error bit address range is included in the data bit inversion address range of either of the data inversion registers 314. With the error bit address range registered (No branch of step S365), the flow shifts to step S366. In step S366, the ECC controller 311 or the bit count and inversion control unit 313 registers the error bit address range in a data inversion register 314 and sets the value of the corresponding data polarity flag to 1.

With the error bit address range not registered (branch of Yes of step S365), the flow ends. Alternatively, a redundant process is optionally executed for the memory cells 111 of the error bit address range, and/or the error bit address range is registered in a write verification register 324 and the corresponding write verification flag 325 is set to 1 (step S367).

FIG. 33 illustrates the flow of refresh of the sixth embodiment. First, the refresh controller 326 initializes the refresh controller 326 to N=0 in step S371. Note that N is the ID of a register (refresh register 327). In step S372, the refresh controller 326 determines whether the value REFLG_N of the refresh flag 328 is 1. With the value REFLG_N not being 1 (No branch of step S372), the refresh controller 326 increments N by one in step S374, and returns to step S372.

With the value REFLG_N being 1 (Yes branch of step S372), the refresh controller 326 executes the refresh based on the thermal data TEout. A specific example is as follows. First, the refresh controller 326 determines whether the value of the thermal data TEout is 00 in step S373. With the value being 00 (Yes branch of step S373), the flow shifts to step S374; otherwise, the refresh controller 326 determines whether the value of the thermal data TEout is 01 in step S381. With the value being 01 (Yes branch of step S381), the refresh controller 326 waits for a lapse of time equal to the interval of the signal TIout in step S382, and the flow shifts to step S383.

In step S383, the refresh controller 326 executes the refresh to the memory cells 111 of the address range in the refresh register 327 of the value REFREG_N through the ECC controller 311, bit count and inversion control unit 313 and memory access controller 303. FIG. 34 illustrates part, or a subflow of the refresh of the sixth embodiment. The FIG. 34 flow consists of some of the steps of the FIG. 31 flow.

First, with the read address registered (Yes branch of step S341), the bit count and inversion control unit 313 executes a data inversion process in step S342. With the read address not registered (No branch of step S341) or after the completion of step S342, the ECC controller 311 attempts to correct an error of the read data. With the read data RDin including no error (Yes branch of step S344), the ECC controller 311 outputs the read data RDin as read data RDout in step S345. With the read data RDin including an error (No branch of step S344), the ECC controller 311 determines whether the error is correctable in step S346. With the error uncorrectable (No branch of step S346), the ECC controller 311 notifies the refresh controller 326 of the occurrence of the uncorrectable error in step S380. With the error correctable (Yes branch of step S346), the ECC controller 311 writes again the error-corrected read data RDin and parity REin in the memory device 200 through the bit count and inversion control unit 313 and the memory access controller 303 in step S352. With this subflow, when the data of the memory cells 111 of the refresh-target address range includes an error, correct data is rewritten in the memory cells 111.

Referring back to FIG. 33, step S383 continues at step S374. With the value not being 01 in step S381 (No branch), the refresh controller 326 determines whether the value of the thermal data TEout is 10 in step S385. With the value being 10 (Yes branch of step S385), the refresh controller 326 waits for a lapse of time equal to the interval of the signal TIout/2 in step S386, and the flow shifts to step S383;

otherwise, it shifts to step S387. In step S387, the refresh controller 326 determines whether the value of the thermal data TEout is 11. With the value being 11 (determination of step S387 resulting in Yes branch), the refresh controller 326 waits for a lapse of time equal to the interval of signal TIout/4 in step S388 and the flow shifts to step S383; otherwise, it shifts to step S390. In step S390, the refresh controller 326 returns error status (Sys_Status=1) to the host device 400, and the flow ends.

As described above, in a test during, for example, periodical maintenance after the shipment of the memory device 200 and the memory controller 300, one or more of the registers 312, 314, 324 and 327 and the flags 315, 325 and 328 can be set at step S400. As tests after shipment, some or all of the flows of FIGS. 22 to 25 can be executed, for example. The values of the registers and flags are set again in accordance with the results of the tests. A maintenance device may read the error bit address ranges in the error bit registers 312 to execute redundant processes to the read address ranges. Moreover, the maintenance device may move the program in the memory device 200 from a particular area to another area in accordance with the results of the tests.

As described, the memory controller 300 of the sixth embodiment has the registers 312, 314, 324 and 327 and the flags 315, 325 and 328. In accordance with the values in the registers and flags, the memory controller 300 inverts bits of data to be written in particular areas, executes the write verification on particular conditions to particular areas, and executes the refresh to particular areas. By setting the registers and flags appropriately in accordance with the pre-shipment or post-shipment properties of the memory device 200 controlled by the memory controller 300, errors in reads and/or writes can be suppressed. For example, the write verification can reduce write errors. Moreover, in accordance with the usage of the memory device 200 and/or the usage for all areas of the memory device 200, write data is made 0-rich or 1-rich. This can reduce voltage stress in areas which experience frequent writes, or raise the tolerance to the read disturb in areas which experience frequent reads.

Moreover, the refresh is executed in accordance with the temperature of the memory device 200 to allow for repairing errors in a stage where each particular error correction unit has few error bits and therefore they are repairable. Without the refresh, when error bits accumulate in an error correction unit in number, such a unit becomes an area whose error bits are not repairable. Accumulation of such error bits is reset by the refresh. FIG. 35 illustrates the relation of the accumulation of error bits and a time with the refresh of the sixth embodiment in a memory area of a size equal to an error correction unit in the memory device 200. FIG. 35 also illustrates a case without the refresh. In this case, one-bit error per certain memory area is correctable but two-or-more-bit errors are uncorrectable. Without the refresh, a one-bit error occurs in the memory at time t1. Another one-bit error occurs in the memory area at time t2 to result in a two-bit error in the memory area. Because of this, the errors of the data in this memory area can be corrected no more. Still another one-bit error occurs at each of times t5 and t6, and thus the count of the error bits in the memory area may keep increasing without the refresh.

In contrast, with the refresh, a one-bit error occurs in a memory area, for example, at time t3. Note that the a case with the refresh, i.e., the six-embodiment-case, illustrates a frequency of error occurrences lower than that of the case without the refresh, which results from a low error occurrence rate because of the write verification in the first place. The refresh is executed at time t4 to re-write one-bit data incorrectly stored into correct data. This resets the accumulated error bit count to zero. This allows for an error, which occurs at time t7, to be corrected. At time t8, the one-bit data which has come to be stored incorrectly due to an error at time t7 is rewritten to correct data. This resets the accumulated error bit count to zero again. Thus, the accumulation of error bits is reset to prevent an uncorrectable error occurrence.

Seventh Embodiment

The seventh embodiment is similar to the sixth embodiment, and differs from the sixth embodiment in some components in the memory controller 300 being in the memory device 200.

FIG. 36 illustrates functional blocks of the memory device of the seventh embodiment. The memory device 200 includes, in addition to the components illustrated in FIG. 11, an ECC controller 211, error bit registers 212, a bit count and inversion control unit 213, a temperature sensor 221, a timer 222, a write verification controller 223, write verification registers 224, write verification flags 225, a refresh controller 226, refresh registers 227, refresh flags 228, data inversion flags (DINFLG) 231, and an ECC holder 232.

The ECC controller 211, error bit registers 212, bit count and inversion control unit 213, temperature sensor 221, timer 222, write verification controller 223, write verification registers 224, write verification flags 225, refresh controller 226, refresh registers 227, and refresh flags 228 correspond to the ECC controller 311, error bit register 312, bit count and inversion control unit 313, temperature sensor 321, timer 322, write verification controller 323, write verification registers 324, write verification flags 325, refresh controller 326, refresh registers 327, and refresh flags 228 of the sixth embodiment, respectively. The description for the components (functional blocks) in the sixth embodiment basically applies also to the corresponding components in the seventh embodiment. The write verification controller 223 and refresh controller 226 are provided, for example, in the memory core controller 203.

The ECC controller 211 receives write data Din from the I/O controller 205, and outputs write data Dio in accordance with the write data Din. The write data Din is based on data Mem_DQ. The ECC controller 211 also generates a parity Pio from the write data Din in accordance with predetermined rules for generating error correction codes. A parity Pio is generated for every error correction unit of a predetermined size of the write data Din. The ECC controller 211 supplies the data Dio and the parity Pio to the memory cell array 207 and ECC holder 232, respectively. The ECC holder 232 stores the supplied parity Pio.

The ECC controller 211 also receives read data Dio and a corresponding parity Pio from the memory cell array 207 and the ECC holder 232. The ECC controller 211 uses the parity Pio to correct an error of the corresponding read data Dio to supply error-corrected read data Dout to I/O controller 205. The ECC controller 211 can correct a predetermined number (for example, one bit) of errors in the input data (for example, part of read data Dio) of a size equal to an error correction unit. When the error bit register 212 corrects an error in the read data Dio, it stores the predetermined-sized address range which includes the address of the memory cells 111 which stored that read data Dio.

The bit count and inversion control unit 213, the write verification controller 223 and the refresh controller 226 have substantially the same functions as the bit count and inversion control unit 313, the write verification controller 323 and the refresh controller 326 of the memory controller 300, respectively. Inputs and outputs, however, differ between the bit count and inversion control units 213 and 313.

The temperature sensor 221 and the timer 222 are the same as the temperature sensor 321 and the timer 322 of the memory controller 300. The thermal data TEout and signal TIout are received by the memory core controller 203.

The registers 212, 224 and 227 and flags 215, 225 and 228 are the same as the registers 312, 324 and 327 and flags 315, 325 and 328 of the memory controller 300 respectively.

The data inversion flags 231 are similar to the data polarity flags 315. The data polarity flags 315 indicate the values of the bits which should be in the majority, whereas the data inversion flags 231 indicate whether bits of data are inverted. Specifically, the data inversion flags 231 each indicate, for a set of particular memory cells 111 (for example, page), whether the corresponding memory cell set stores data bit-inverted or not. For example, a data inversion flag 231 indicates non bit-inversion by the value 0, and bit inversion by the value 1. The data polarity flags 215 also indicate the values for respective pages. The write verification flags 225 and/or the refresh flags 228 may also store values for respective pages.

The ECC holder 232 and flags 215, 225, 228 and 231 may be held in the memory cells 111.

As described above, the memory device 200 of the seventh embodiment includes the ECC controller 211, the error bit registers 212, the bit count and inversion control unit 213, the temperature sensor 221, the timer 222, the write verification controller 223, the write verification registers 224, the write verification flags 225, the refresh controller 226, the refresh registers 227, the refresh flags 228 and the data inversion flags 231. In accordance with this, the memory controller 300 of the seventh embodiment does not include some components included in the memory controller 300 of the sixth embodiment (FIG. 11). FIG. 37 illustrates functional blocks of the memory controller 300 of the seventh embodiment.

The memory controller 300 includes only the address FIFO 301, the command FIFO 302, the memory access controller 303, and the write data FIFO 304 and the read data FIFO 305 among the components of FIG. 11 (sixth embodiment). The write data FIFO 304 receives write data Sys_DQIN, and outputs write data MWDout. The read data FIFO 305 receives read data MRDin from the memory access controller 303, and outputs read data Sys_DQOUT. A status signal Sys_Status is output from the memory access controller 303.

The values of the registers 212, 224 and 227 and the flags 215, 225 and 228 are set by the FIG. 20 flow (sixth embodiment). Steps S100, S200 and S400 are common between the sixth and seventh embodiments except for the difference in the registers and flags being located in the memory controller 300 (sixth embodiment) or in the memory device 200 (seventh embodiment). In contrast, steps S300 slightly differ between the sixth and seventh embodiments as described below. Step S300 includes one or more of the flows of FIGS. 38 to 41. The memory device 200 is configured to execute the flows of FIGS. 38 to 41. FIG. 38 illustrates the flow of a write of the seventh embodiment. Steps S511 to S514 are similar to steps S311 to S314 of FIG. 27, respectively. When the memory device 200 receives a write command, a write address, write-data Mem_DQ and Mem_DQS, a write begins. The Data Mem_DQ and Mem_DQS are received by the ECC controller 211. In step S511, the ECC controller 211 receives write data Din based on the data Mem_DQ, and generates write data Dio and a parity Pio from the write data Din.

In step S512, the bit count and inversion control unit 213 determines whether the data inversion flag 231 for the set of the memory cells 111 (for example, page) specified by the write address is 1. With the value not being 1 (No branch of step S512), the flow shifts to step S513. In step S513, the ECC controller 211 learns that the write-target area (page) is not a subject of the bit inversion from the bit count and inversion control unit 213, and supplies the write data Dio and the parity Pio to the memory cell array 207 and the ECC holder 232, respectively. The supplied write data Dio and parity Pio are written in the write-target set of the memory cells 111 by control of the memory core controller 203.

With the value being 1 in step S512 (Yes branch), the flow shifts to step S514. In step S514, the bit count and inversion control unit 513 maintains or inverts all the bits of the write data Dio and the parity Pio to supply the set of non-inverted or inverted write data Dio and parity Pio to the memory cell array 207 and the ECC holder 232, respectively. The supplied write data Dio and parity Pio are written in the write-target set of the memory cells 111 in step S513. Step S514 can be executed as the flow of FIG. 28. The description for the bit count and inversion control unit 313 and the data polarity flags 315 within the description for FIG. 28 also applies to the bit count and inversion control unit 213 and data inversion flag 231.

FIG. 39 illustrates the flow of write verification of the seventh embodiment. The memory device 200 executes the flow of FIG. 39, for example after the flow of FIG. 38 ends. Steps S531 to S535, S537 and S538 are similar to steps S331 to S335, S337 and S338 of FIG. 30, respectively. In step S531, the write verification controller 223 determines whether the write address is included in the address range of either of the write verification registers 224. With the write address not registered (No branch of step S531), the flow ends; otherwise (Yes branch of step S531), the write verification controller 223 determines whether the conditions to trigger the write verification are fulfilled in step S532. The conditions are the same as those in step S332. When the conditions to trigger the write verification are fulfilled, the write verification controller 223 reads the data stored in the memory cells 111 of the write address through the memory core controller 203 in step S533.

In step S534, the write verification controller 223 compares the read data with the data which should have been written in the memory cells 111 of the write address. When the two data items match (Yes branch of step S534), the flow ends; otherwise (No branch of step S534), the write verification controller 223 writes the read data to the memory cells ill of the write address in step S535.

In steps S537 and S538, the write verification controller 223 executes the same steps as steps S533 and S534, respectively. When the two data items match (Yes branch of step S538), the flow ends; otherwise (No branch of step S538), it shifts to step S539. In step S539, the write verification controller 223 registers the address targeted for the write verification into an error bit register 212. Failure of a write may result in execution of re-writes twice or more as in FIG. 30.

FIG. 40 illustrates the flow of a read of the seventh embodiment. Steps S541 to S546 and S551 to S555 are similar to steps S341 to S346 and S351 to S355 of FIG. 30, respectively. When the memory controller 300 receives a read command and a read address, a read begins. With the start, the memory core controller 203 reads the read data Dio and the corresponding parity Pio from the memory cells 111 of the read address to the ECC controller 211. In step S541, the ECC controller 211 determines whether the data inversion flag 231 for the read-target area (page) is 1 through the bit count and inversion control unit 213. With the flag being 1 (Yes branch of step S541), the flow shifts to step S542. In step S542, the bit count and inversion control unit 213 maintains or inverts the bits of the read data Dio and the parity Pio to supply the set of non-inverted or inverted read data Dio and parity Pio to the ECC controller 211.

As step S542, the memory controller 300 can execute the FIG. 28 flow. In this case, the data targeted for the bit inversion is the read data Dio and the parity Pio. Moreover, of the description for FIG. 28, description of the bit count and inversion control unit 313 and the data polarity flags 315 applies to the bit count and inversion control unit 213 and the data inversion flags 231.

With the flag not being 1 in step S541 (No branch of step S541), the flow shifts to step S543. Step S542 also continues at step S543. The ECC controller 211 attempts to correct an error with the read data Dio and parity Pio in step S543. With the determination in step S544 indicating the read data Dio not including an error (Yes branch), the ECC controller 211 supplies data Dout based on the read data Dio to the I/O controller 205 in step S545.

With the read data Din including an error (No branch of step S544), the ECC controller 211 determines whether the error is correctable in step S546. With the error uncorrectable (No branch of step S344), the ECC controller 211 registers the read address or an address range including the read address into an error bit register 312 in step S554. In addition or alternatively to step S554, the memory core controller 203 may stop operation in the memory device 200 except for the access to the error bit registers 212 to prevent malfunction of the memory device 200. In addition or alternatively to step S554, the ECC controller 211 may output data Mem_DQ and Mem_DQS with a particular pattern to notify occurrence of errors to the memory controller 300.

With the error correctable (Yes branch of step S546), the ECC controller 211 corrects the error, and, in accordance with the error-corrected read data Dio, supplies read data Dout to the I/O controller 205 in step S551.

In step S552, the ECC controller 211 writes again the error-corrected read data Dio and parity Pio in the memory cells 111 of the read address through the memory core controller 203. In step S553, the ECC controller 211 determines whether the read address is included in the address range of either of the error bit registers 212. With the read address not registered (No branch of step S553), the ECC controller 311 registers the read address or an address range including the read address into an error bit register 212 in step S554. With the read address not registered (Yes branch of step S553), the flow ends. The read address or the address range including the read address may be optionally multiply registered into an error bit register 212 (step S555).

After the registration to the error bit register in step S554, the FIG. 32 flow is executed. Of the description for FIG. 32, description of the ECC controller 311, the refresh controller 326, the write verification registers 324, and the refresh registers 327 applies to the ECC controller 211, the refresh controller 226, the write verification registers 224, and the refresh register 227s. Moreover, the data inversion flag 231 corresponding to the error bit address range is set to 1 instead of the registration to the data inversion register 314 of the error bit address range in step S366.

Figure 41:
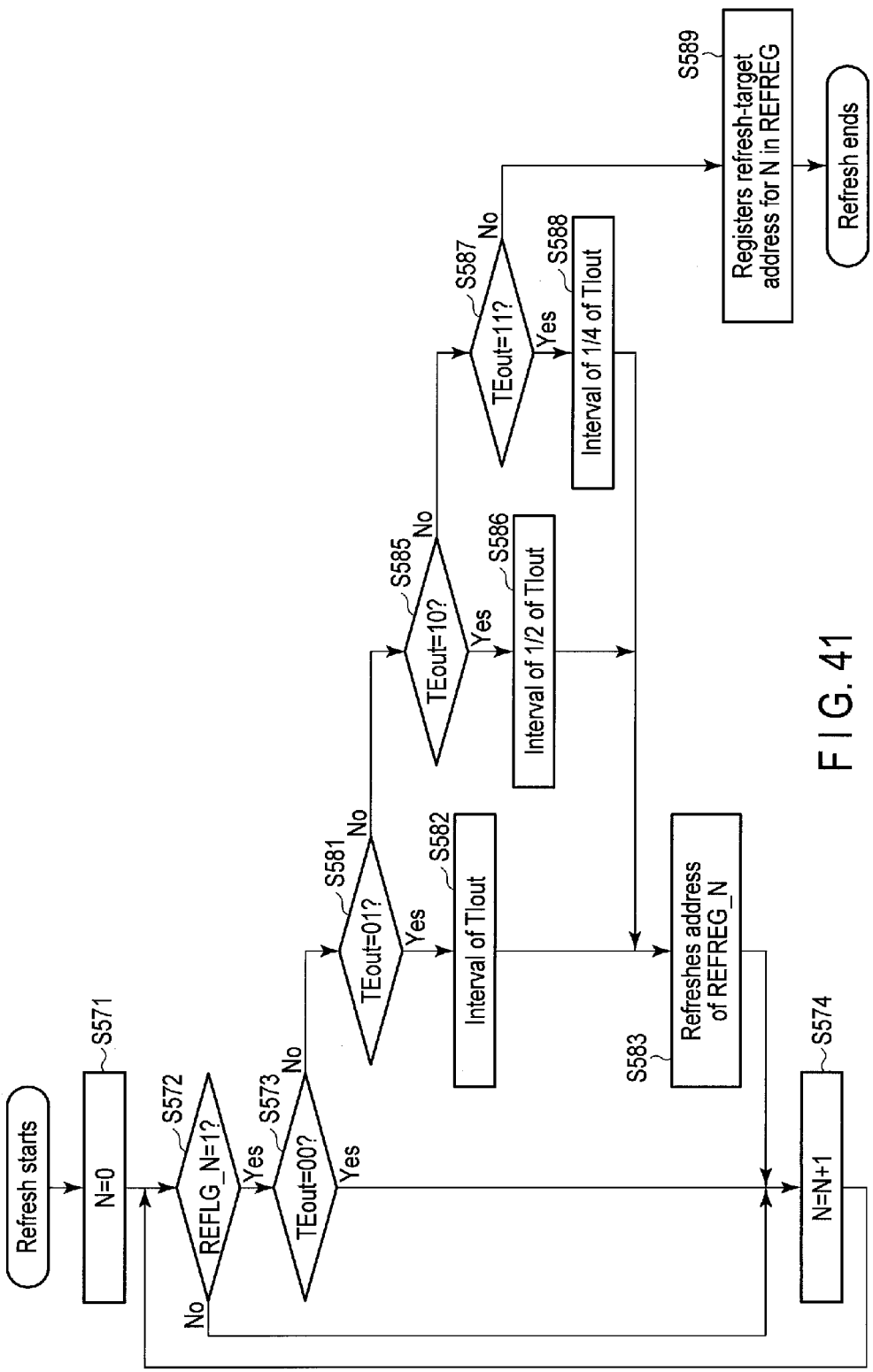
FIG. 41 illustrates the flow of refresh of the seventh embodiment.

FIG. 41 illustrates the flow of refresh of the seventh embodiment. Steps S571 to S574, S581 to S583, and S585 to S588 are similar to steps S371 to S374, S381 to S383, and S385 to S388 of FIG. 33, respectively. The refresh controller 226 starts the flow of FIG. 33 periodically, for example in accordance with the output TIout of the timer 222. Alternatively, the refresh controller 226 starts the FIG. 33 flow in response to a command from the memory controller 300.

In step S571, the refresh controller 226 initializes N=0. In step S572, the refresh controller 226 determines whether the value REFLG_N of the refresh flag 228 is 1. With the value REFLG_N not being 1 (No branch of step S572), the refresh controller 226 increments N by one in step S574, and returns to step S572.

With the value REFLG_N being 1 (Yes branch of step S572), the refresh controller 226 determines the value of the thermal data TEout, and in accordance with the value executes refresh. First, the refresh controller 226 determines whether the value of the thermal data TEout is 00 in step S573. With the value being 00 (Yes branch of step S573), the flow shifts to step S574; otherwise, the refresh controller 226 determines whether the value of the thermal data TEout is 01 in step S581. With the value being 01 (Yes branch of step S581), the refresh controller 226 waits for a lapse of time equal to the interval of the signal TIout to step S583 in step S582, and the flow shifts to step S583.

In step S583, the refresh controller 226 executes the refresh to the memory cells 111 of the address range in the value REFREG_N of the refresh registers 227 through the ECC controller 211, the bit count and inversion control unit 213 and the memory core controller 203. Step S583 can be executed by the subflow of FIG. 34. The FIG. 34 subflow consists of a subset of the steps of FIG. 31, and in accordance with this, each step of the FIG. 34 subflow as step S583 is executed as a corresponding step of FIG. 40, which corresponds to FIG. 31. Specifically, steps S341 to S344, S346 and S352 of FIG. 31 correspond to steps S541 to S544, S546 and S552 of FIG. 40. Moreover, the description of step S380 for the ECC controller 311 and the refresh controller 326 applies to the ECC controller 211 and the refresh controller 226.

Step S583 continues at step S574. With the value not being 01 in step S581 (No branch), the refresh controller 226 determines whether the value of the thermal data TEout is 10 in step S585. With the value being 10 (Yes branch of step S585), the refresh controller 226 waits for a lapse of time equal to the interval of the signal TIout/2 in step S586 and the shifts flow shifts to step S583; otherwise, the flow shifts to step S587.

In step S587, the refresh controller 226 determines whether the value of the thermal data TEout is 11. With the value being 11 (determination of step S587 being Yes branch), the refresh controller 226 waits for a lapse of time equal to the interval of the signal TIout/4 in step S588 and the flow shifts to step S583; otherwise, the flow shifts to step S589. In step S589, the refresh controller 226 registers the address range in the refresh register 227 for the current N into an error bit register 212. In addition or alternatively to step S589, the memory core controller 203 may stop operation in the memory device 200 except for the access to the error bit registers 212 to prevent malfunction of the memory device 200. In addition or alternatively to step S589, the ECC controller 211 may output data Mem_DQ and Mem_DQS with a particular pattern to notify occurrence of errors to the memory controller 300.

As described, the memory device 200 of the seventh embodiment has the registers 212, 224 and 227 and flags 215, 225, 228 and 231. The registers 212, 224 and 227 and flags 215, 225 and 228 store the same kind of information as the registers 312, 324 and 327 and flags 315, 325 and 328 of the sixth embodiment, and the flags 231 store the same kind of information as the registers 314. In accordance with the values in these registers and flags, the memory device 200 inverts bits of data to be written in particular areas, executes the write verification on particular conditions to particular areas, and executes the refresh to particular areas. This can produce the same advantages as those in the sixth embodiment.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory device comprising:
   memory elements;
   an encoder which generates a write data parity from write data to the memory elements;
   a decoder which corrects an error of read data from the memory elements using a read data parity for the read data and a check matrix; and
   an inverter which maintains or inverts all bits of a received input,
   wherein:
   calculation by the decoder using the read data, the read data parity, and the check matrix produces:
      a first result when an error is not included in the read data,
      a second result when an error is included in the read data,
      a third result when an error is not included in the read data and all bits of the read data are inverted, and
      a fourth result when an error is included in the read data and all bits of the read data are not inverted.

2. The device of claim 1, wherein:
   the write data and the write data parity comprise bits each having a first value or a second value, and
   the memory device further comprises a comparator which compares a count of first values with a count of second values in the write data and/or the write data parity.

3. The device of claim 2, wherein the inverter inverts all bits of the write data in accordance with a result of the comparison.

4. The device of claim 3, wherein the inverter:
   inverts all bits of the write data when the count of the first values of the write data is larger than the count of the second values of the write data, and
   does not invert all bits of the write data when the count of the first values of the write data is not larger than the count of the second values of the write data.

5. The device of claim 2, wherein the inverter inverts all bits of the write data and the write data parity in accordance with a result of the comparison.

6. The device of claim 5, wherein the inverter:
   inverts all bits of the write data and the write data parity when the count of the first values of the write data and the write data parity is larger than the count of the second values of the write data and the write data parity, and
   does not invert all bits of the write data and the write data parity when the count of the first values of the write data and the write data parity is not larger than the count of the second values of the write data and the write data parity.

7. The device of claim 1, wherein each of the memory elements comprises a first layer and a second layer, and has two switchable states determined in accordance with magnetization orientation of the first layer and magnetization orientation of the second layer.

8. A memory controller which controls a memory device, comprising:
   a first register; and
   an error correction code (ECC) controller which:
      generates a parity from write data to the memory device,
      when read data from the memory device includes an error, uses a parity for the read data to correct the error, and
      registers a first address range including an address of the memory device storing the read data into the first register when the read data includes an error;
   wherein the controller:
   further comprises a second register which stores a second address range of the memory device,
   stores a flag, and
   further comprises a refresh controller which:
      receives thermal data based on a temperature of the memory controller, and
      when the flag indicates execution of refresh, in accordance with the thermal data, reads data stored in the second address range, corrects an error of the read data through the ECC controller, and writes corrected read data in the second address range.

9. The controller of claim 8, wherein:
   the write data and the parity comprise bits each having a first value or a second value, and
   the memory controller:
   further comprises a third register storing a third address range of the memory device,
   stores a flag indicating the first value or the second value, and
   further comprises a bit inversion controller which inverts all bits of the write data and the parity when an address of the write data is included in the third address range and a majority of the first and second values of the write data and the parity differs from one of the first and second values indicated by the flag.

10. The controller of claim 8, wherein the controller:
   further comprises a third register which stores a third address range of the memory device,
   stores a flag, and
   further comprises a write verification controller which:
      receives the thermal data based on the temperature of the memory controller,
      when an address of the write data is included in the third address range and the flag indicates execution of write verification, in accordance with the thermal data, writes the write data in the address, reads data from the address and writes the write data in the address again when the read data does not match the write data.

11. The controller of claim 8, wherein the ECC controller registers an address range including the address of the read data into the second register when the read data includes an error.

12. The controller of claim 8, wherein the memory device comprises memory elements each of which comprises a first layer and a second layer and has two switchable states determined in accordance with a magnetization orientation of the first layer and magnetization orientation of the second layer.

13. A memory device comprising:
memory elements;
a first register; and
an error correction code (ECC) controller which:
  generates a parity from write data to the memory elements,
  when read data from the memory elements includes an error, uses a parity for the read data to correct the error, and
  registers a first address range including an address of the memory device storing the read data into the first register when the read data includes an error,
wherein the device:
further comprises a second register which stores a second address range of the memory device,
stores a flag, and
further comprises a refresh controller which:
  receives thermal data based on a temperature of the memory controller,
  when the flag indicates execution of refresh, in accordance with the thermal data, reads data stored in the second address range, corrects an error of the read data through the ECC controller, and writes corrected read data in the second address range.

14. The device of claim 13, wherein:
the write data and the parity comprise bits each having a first value or a second value, and
the memory device:
  holds a first flag and a second flag for a subset of the memory elements, and
  further comprises a bit inversion controller which inverts all bits of the write data and the parity when the first flag indicates bit inversion and majority of the first and second values of the write data and the parity differs from one of the first and second values indicated by the second flag.

15. The device of claim 13, wherein the device:
further comprises a third register which stores a third address range of the memory device,
stores a flag,
further comprises a write verification controller which:
  receives the thermal data based on the temperature of the memory device,
  when an address of the write data is included in the third address range and the flag indicates execution of write verification, in accordance with the thermal data, writes the write data in the address, reads data from the address and writes the write data in the address again when the read data does not match the write data.

16. The device of claim 13, wherein the ECC controller registers an address range including the address of the read data into the second register when the read data includes an error.

17. The device of claim 13, wherein each of the memory elements comprises a first layer and a second layer and has two switchable states determined in accordance with magnetization orientation of the first layer and magnetization orientation of the second layer.

* * * * *